United States Patent
Ellul et al.

(10) Patent No.: US 6,268,438 B1
(45) Date of Patent: *Jul. 31, 2001

(54) THERMOPLASTIC ELASTOMERIC COMPOSITIONS

(75) Inventors: Maria Dolores Ellul, Silver Lake; Donald Ross Hazelton, Hudson, both of OH (US); Charles Cozewith, Bellaire; Aspy Keki Mehta, Humble, both of TX (US)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,382

(22) Filed: Dec. 16, 1997

Related U.S. Application Data

(60) Provisional application No. 60/033,463, filed on Dec. 17, 1996.

(51) Int. Cl.$^7$ .............................. C08L 23/00; C08F 4/144
(52) U.S. Cl. ...................... 525/240; 525/197; 526/127; 526/119; 526/160; 526/348.1; 502/113; 502/117; 521/143
(58) Field of Search ...................... 525/197, 240; 521/143; 502/113, 117; 526/127, 119, 160

(56) References Cited

U.S. PATENT DOCUMENTS

| | | | |
|---|---|---|---|
| 4,530,915 | 7/1985 | Ewen et al. | 502/113 |
| 4,871,705 | 10/1989 | Hoel | 502/117 |
| 4,900,490 * | 2/1990 | Kozma | 264/54 |
| 4,937,299 | 6/1990 | Ewen et al. | 526/119 |
| 5,017,714 | 5/1991 | Welborn, Jr. | 556/12 |
| 5,023,300 * | 6/1991 | Huff et al. | 525/194 |
| 5,086,121 * | 2/1992 | Hazelton et al. | 525/197 |
| 5,120,867 | 6/1992 | Welborn, Jr. | 556/12 |
| 5,124,418 | 6/1992 | Welborn, Jr. | 526/114 |
| 5,198,401 | 3/1993 | Turner et al. | 502/155 |
| 5,210,139 * | 5/1993 | Huff et al. | 525/194 |
| 5,278,119 | 1/1994 | Turner et al. | 502/155 |
| 5,290,886 | 3/1994 | Ellul | 524/515 |
| 5,304,614 | 4/1994 | Winter et al. | 526/127 |
| 5,324,800 | 6/1994 | Welborn, Jr. et al. | 526/160 |
| 5,347,025 | 9/1994 | Yamada et al. | 556/11 |
| 5,350,723 | 9/1994 | Neithamer et al. | 502/104 |
| 5,387,620 * | 2/1995 | Park et al. | 521/143 |
| 5,391,789 | 2/1995 | Rohrmann | 556/11 |
| 5,391,790 | 2/1995 | Rohrmann et al. | 556/28 |
| 5,741,563 | 4/1998 | Mehta et al. | 428/35.1 |

FOREIGN PATENT DOCUMENTS

| | | |
|---|---|---|
| 646624 | 4/1995 | (EP) . |
| 0 751 182 | 1/1997 | (EP) . |
| 0751182 A1 * | 1/1997 | (EP) . |
| WO 96/06132 | 2/1996 | (WO) . |
| 9619533 * | 6/1996 | (WO) . |
| WO 96 19533 | 6/1996 | (WO) . |
| O 97/11115 | 3/1997 | (WO) . |
| WO 97 48538 | 12/1997 | (WO) . |

OTHER PUBLICATIONS

Polymer Technology Dictionary, T. Whelan, !–st edition Chapman & Hall, p. 125, 1994.*

* cited by examiner

*Primary Examiner*—David W. Wu
*Assistant Examiner*—Tanya Zalukaeva
(74) *Attorney, Agent, or Firm*—John Schneider

(57) ABSTRACT

A cross-linked or at least partially cross-linked thermoplastic elastomeric composition formed of from 10 to 90 percent of a first polymeric material comprised of ethylene, α-olefin and optionally a non-conjugated diene, and 90 to 10 percent of a second olefin polymeric material, wherein at least one of the first or second polymeric materials is at least partially the product of a metallocene polymerization reaction.

10 Claims, 3 Drawing Sheets

Effect of MFR on Toughness at 23°C

Effect of MFR on ACR Viscosity at 200°C

Ziegler PP and Metallocene PP at Various MFR

Effect of Polypropylene MFR in TPE

Effect of Polypropylene MFR in TPE

THERMOPLASTIC ELASTOMERIC COMPOSITIONS

This application is based on Provisional Application Ser. No. 60/033,463, filed Dec. 17, 1996.

FIELD OF THE INVENTION

This invention relates to at least partially cross-linked olefin thermoplastic elastomers containing at least one polymer derived from a metallocene production process.

BACKGROUND OF THE INVENTION

Olefin thermoplastic elastomers have been widely used, particularly as substitutes for vulcanized rubbers, and more particularly in the field of molded products. These cross-linked olefin thermoplastic elastomers possess exceptional properties, including tensile strength, elongation at break, elastomeric properties, and heat resistance.

Historically, many of the elastomers of the type identified above, have been constructed of polymers made from a Ziegler-Natta catalyzed reaction. However, as described in U.S. Pat. No. 5,198,401, herein incorporated by reference, and International Application No. W097/11115, also herein incorporated by reference, the polymerization of olefins, diolefins and acetylenically unsaturated monomers to homopolymers and copolymers in the presence of an ionic metallocene catalyst is now producing unique materials. For example, the polypropylene polymers obtained via the metallocene catalysis process are generally at least substantially isotactic and often fully isotactic. As an additional example of a unique compound obtained via metallocene catalysis, low ethylene content EPR's are being produced. Specifically, the reactions are performed in the presence of a metallocene catalyst of the general formula

wherein Cp is a cyclopentadienyl ring or a derivative thereof; M is a Group IV, V or VI transition metal; R is a hydrocarbyl group or hydrocarboxyl group having from 1 to 20 carbon atoms; X is a halogen and, m equals 1 to 3; n equals 0 to 3; Q equals 0 to 3, and the sum of m+n+q is equal to the oxidation strength of the transition metal. Further examples of metallocenes catalysts and processes are provided for in U.S. Pat. Nos. 4,530,914; 4,871,705; 4,937,299; 5,124,418; 5,017,714; 5,120,867; 5,278,119; 5,304,614; 5,324,800; 5,347,025; 5,350,723; 5,391,790; and 5,391,789, each of which is herein incorporated by reference.

SUMMARY OF THE INVENTION

It is a primary advantage to this invention to provide new and improved dynamically vulcanized thermoplastic elastomers (TPEs) demonstrating superior characteristics and/or lower production costs.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

In accordance with the purpose of the invention, as embodied and broadly described herein, the compositions of this invention comprise a cross-linked or at least partially cross-linked thermoplastic elastomeric composition formed of from 10 to 90 percent of a first polymeric material comprised of ethylene, α-olefin and optionally a nononjugated diene, and 90 to 10 percent of a second olefin polymeric material, wherein at least one of the first or second polymeric materials is at least partially the product of a metallocene polymerization reaction. In this regard, the first or second polymeric material can be comprised of a blend of two or more polymers provided at least one is a metallocene polymer.

In one form of the invention, the first polymeric material is an elastomer of ethylene-propylene-diene-polymethylene, i.e., an EPDM. As used herein, EPDM is intended to reflect a terpolymer of ethylene, propylene and a non-conjugated diene. In an alternative form of the invention, the copolymer is an elastomer of ethylene and propylene, referred to sometimes as EPR and sometimes as EP(D)M—wherein the diene is optional.

In a particularly preferred form of the invention, the EP(D)M rubber has an ethylene content of less than 40 percent. More preferably, the EP(D)M rubber will have an ethylene content of less than 20 percent by weight. However, it is believed that metallocene EP(D)M may have certain advantages even with a $C_2$ above 40 percent.

Polyolefins suitable for use in the thermoplastic phase of the invention include thermoplastic crystalline polyolefin, homopolymers and copolymers. They are desirably prepared from monolefin monomers having three to six carbon atoms such as propylene, 1-butene, isobutylene, 1-pentene and the like, with polypropylene being preferred.

In a further preferred form of the invention, the second olefin polymeric material is polypropylene. In a particularly preferred form, the polypropylene is a metallocene derived polypropylene. In an additional embodiment, a third-or more-polymeric material is added to the composition.

BRIEF DESCRIPTION OF THE DRAWINGS

The invention consists in the novel parts, construction, arrangements, combinations and improvements shown and described. The accompanying drawings, which are incorporated in and constitute a part of the specification illustrate one embodiment of the invention, and together with the description, serve to explain the principles of the invention.

Of the Drawings.

DETAILED DESCRIPTION OF THE INVENTION

Figure 1:
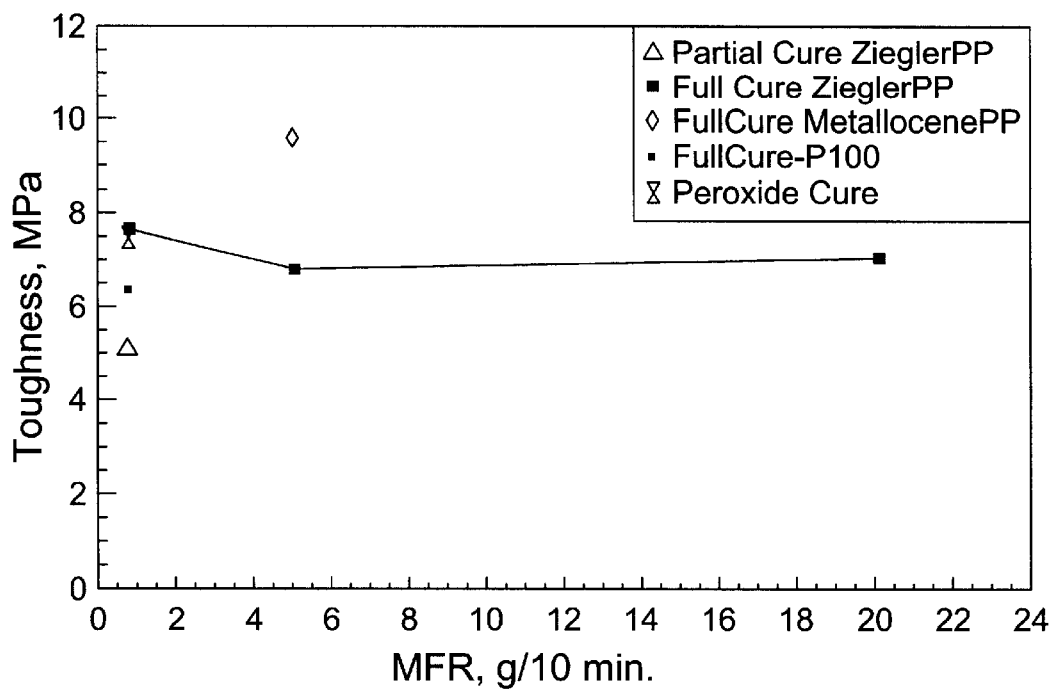
FIG. 1 provides a graphical comparison of melt flow rate versus toughness at 23° C. of TPE compounds in accord with the present invention.
Figure 2:
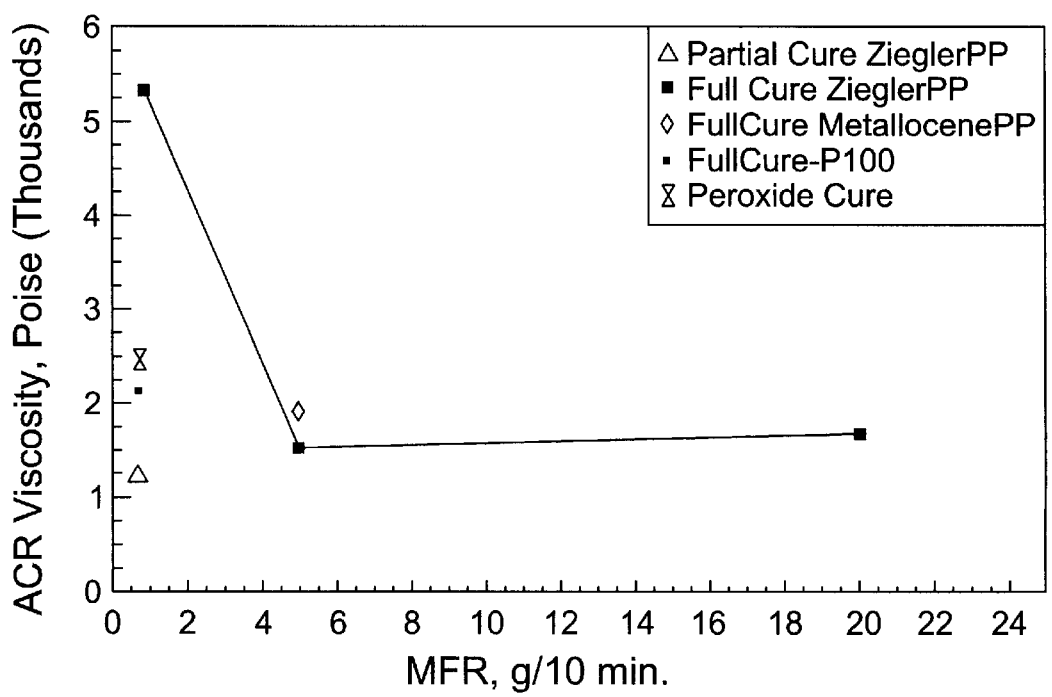
FIG. 2 is a graphical representation of the comparison of melt flow rate versus ACR viscosity at 200° C.
Figure 3:
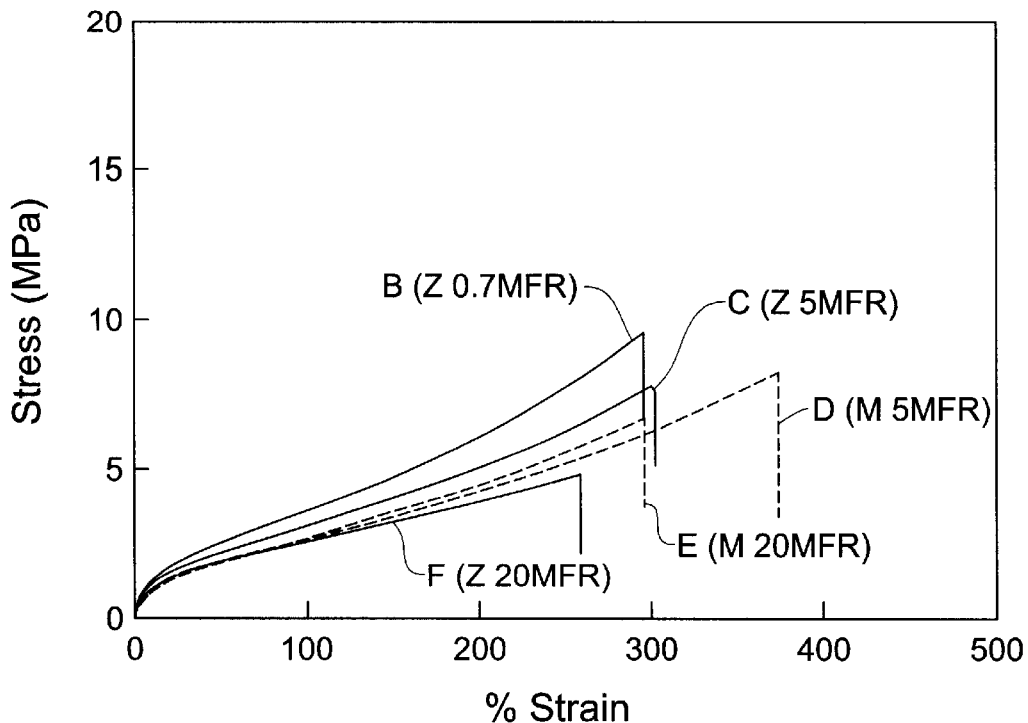
FIG. 3 is a graphical comparison of stress-strain for Ziegler-Natta polypropylene versus metallocene polypropylene at various melt flow rates.
Figure 4:
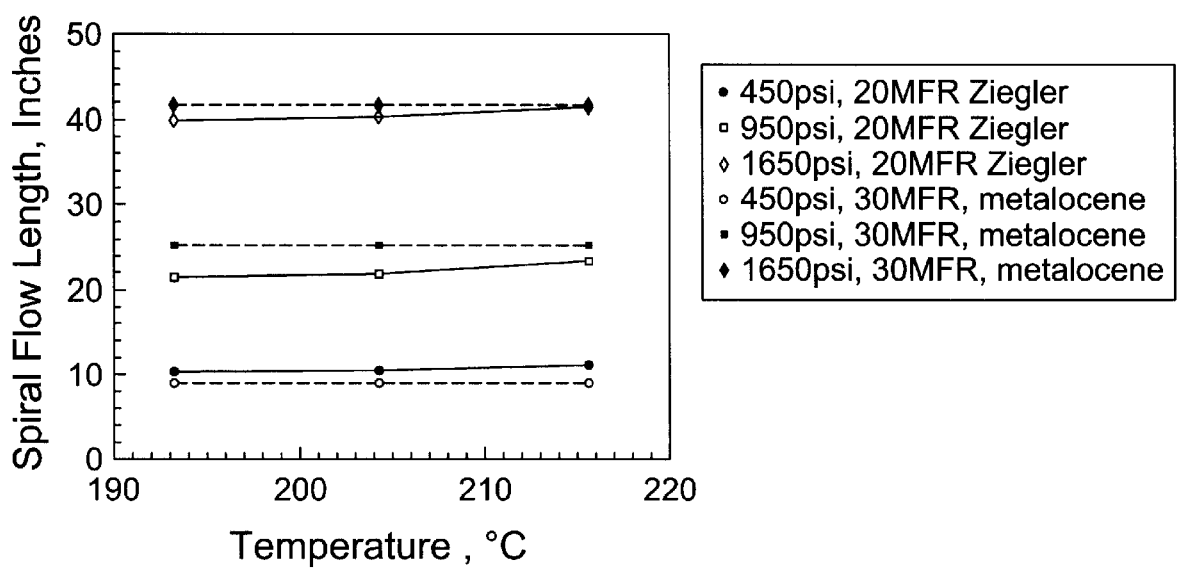
FIG. 4 is a graphical comparison of the spiral flow of DVA's based on polypropylene type at 20 and 30 MFR.
Figure 5:
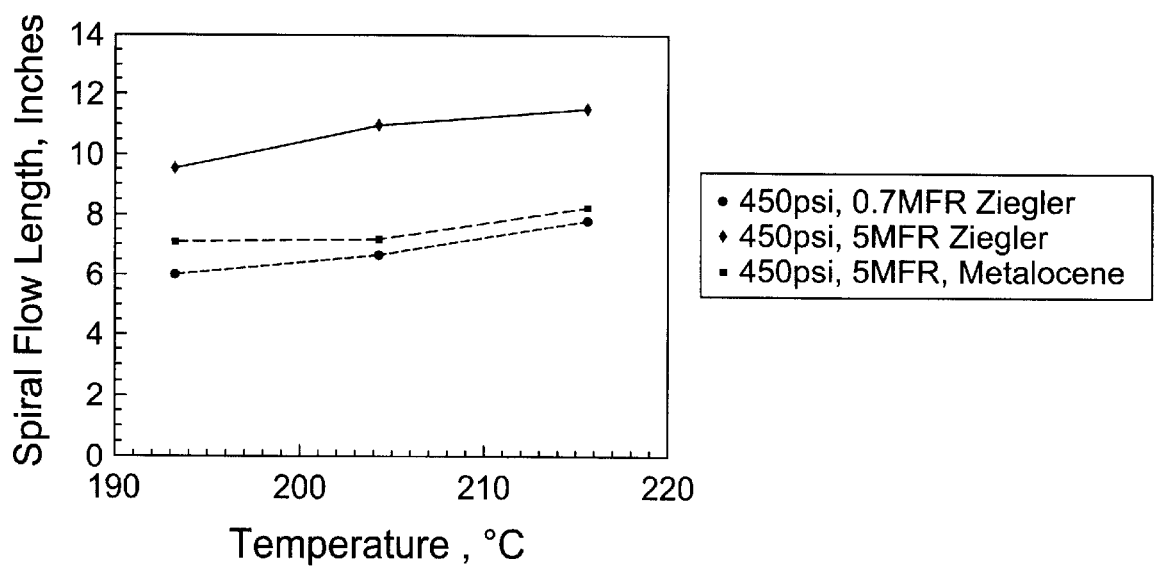
FIG. 5 is a graphical comparison of the spiral flow of DVA's based on polypropylene type at 0.7 and 5 MFR.

Reference will now be made in detail to the present preferred forms of the invention. While the invention will be described in connection with the preferred embodiments, it will be understood that it is not intended to limit the invention to those embodiments. On the contrary, it is intended to cover all alternatives, modifications and equivalents as may be included within the spirit and scope of the invention defined by the appended claims.

This invention is particularly directed to an elastomer phase such as metallocene ethylene, alpha-olefin (diene) polymethylene rubber e.g. ethylene-propylene (diene) polymethylene rubbers EP(D)M and/or a thermoplastic phase such as metallocene polypropylene. Although propylene is the most common alpha-olefin in the representative elastomer, other monomers such as butene-1,1,4-methyl-1-pentene, hexene-1, octenes, decene-1 and combinations thereof can be used. Moreover, in a specific example the invention is directed to the use of EP(D)M rubber as the elastomer component and polypropylene as the plastic component of a dynamically vulcanized alloy (DVA) composition-one of the components being the product of metallocene catalysis.

It has been found that metallocene EP(D)Ms used in dynamically vulcanized alloys increase toughness by a factor of at least two. The dynamically vulcanized alloys of the present invention include, for example, cured blends of EP(D)M with thermoplastic crystalline polyolefins, homopolymers or copolymers. In fact, the invention is directed to the unexpected finding that EP(D)M polymers made by metallocene catalyst having an ethylene content from 10 to 40 percent by weight are excellent elastomers for use in dynamically vulcanized alloys. More specifically, it has been found that EP(D)M polymers having a low ethylene content (i) provide particularly excellent properties in a DVA even at relatively low Mooney viscosities and (ii) provide a lower viscosity versus shear rate. Importantly then, EP(D)Ms having a $C_2$ level below 40 percent provide equivalent or improved physical properties in a DVA as compared to conventional EP(D)Ms, but at a lower cost. Currently, the particular EP(D)Ms which are the focus of the present invention are those prepared via a metallocene catalysis (M) process which is the preferred process for producing these low ethylene polymers. Moreover, EP(D)Ms made by today's Ziegler-Natta catalysts (Z) do not polymerize low $C_2$ content polymers. However, and as demonstrated in the following data, improvements in DVA's have also been achieved using a combination of Ziegler-Natta and metallocene EP(D)Ms.

In the preferred form of the invention, the terpolymer will be used, i.e. EPOM. Suitable non-conjugated dienes include 5-ethylidene-2-norbornene(ENB); 1,4-hexadiene; 5-methylene-2-norbornene(MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD).

In addition to the present invention being related to the improvement of the properties of dynamically vulcanized alloys by the use of low ethylene content EP(D)Ms, it has been found that properties of the dynamically vulcanized alloys comprised of EP(D)Ms and thermoplastic olefin polymer/copolymer thermoplastics can be significantly improved when the thermoplastic olefin polymer/copolymer is prepared via a metallocene catalysis process. Preferably, polypropylene is used.

More specifically, to improve processability of the DVAs, typically defined by the flow of the thermoplastic elastomers, requires either reduction of the cure state or the inclusion of a lower molecular weight polypropylene. Alternatively, improved flow has been achieved by adding relatively high levels of hydrocarbon oil and/or the substitution of isotactic homopolymer polypropylene with impact copolymer polypropylene. Unfortunately, each of these methods generally result in a negative effect on the physical properties of the end product.

Now, however, it has been found that the use of a higher melt flow rate metallocene polyolefin, particularly polypropylene, in the formation of the polypropylene—EP(D)M based DVA, results in significantly improved melt flow (or lower viscosity) without a significant negative effect on the overall physical properties of the compounds. With Ziegler-Natta polymerized polypropylene, it is required to use fractional MFR (high molecular weight) polypropylene to yield similar stress-strain properties. An added advantage in using metallocene polypropylene is its higher crystallization temperature, $T_c$, which should result in shorter cycle times in injection molding.

As used in this description of the invention and the appended claims the term polypropylene includes homopolymers of propylene as well as reactor copolymers of polypropylene which can contain about 1 to 20 percent by weight of ethylene or an α-olefin comonomer of 4 to 16 carbon atoms, and mixtures thereof. Furthermore, it is believed that the use of a combination of metallocene polypropylene and Ziegler-Natta polypropylene also allows for the formation of superior DVA's.

In view of the above, in a particularly preferred form of the invention, the DVAs are comprised of a metallocene polyolefin thermoplastic, particularly polypropylene, and a metallocene EP(D)M, or blends of these with Ziegler-Natta thermoplastics and/or elastomers.

The DVA's of the present invention are preferably formed via melt blending in the presence of rubber curatives in a high shear device at an elevated temperature (e.g. 180° C.). The onset of dynamic vulcanization is accompanied by a rapid increase in mixing torque and an increase in temperature. Morphology typical of these DVAs prepared by dynamic vulcanization generally consists of a discontinuous array of rounded and irregular shaped rubber particles ranging in size from 0.2–5 μm in a continuous polyolefin matrix. Of course, a co-continuous state or a phase inversion is also possible depending on the amount of rubber (e.g. EPDM) relative to the plastic (e.g. polypropylene), and the cure system or degree of cure of the rubber.

The rubber is desirably at least partially cross-linked, and may be completely or fully cross-linked. The partial or complete cross-linking can be achieved by adding an appropriate rubber curative to the blend of polyolefin and elastomer and vulcanizing the rubber to the desired degree under conventional vulcanizing conditions. However, it is preferred that the rubber be cross-linked by the process of dynamic vulcanization.

As used in the specification and claims, the term dynamic vulcanization means a vulcanization or curing process for a rubber contained in a thermoplastic elastomer composition, wherein the rubber is vulcanized under conditions of high shear at a temperature above the melting point of the polyolefin component. The rubber is thus simultaneously cross-linked and dispersed as fine particles within the polyolefin matrix, although other morphologies may also exist.

Dynamic vulcanization is effected by mixing the thermoplastic and elastomer components at elevated temperature on conventional mixing equipment such as roll mills, banbury mixers, brabender mixers, continuous mixers, mixing extruders and the like. The compositions can be processed and reprocessed by conventional plastic processing techniques such as extrusion, injection molding and compression molding. Those of ordinary skill in the art will appreciate the appropriate quantities, types of cure systems and vulcanization conditions required to carry out the vulcanization of the rubber. The rubber can be vulcanized using varying amounts of curative, varying temperature and varying time of cure in order to obtain the optimum cross-linking desired.

Any known cure system for the rubber can be used, so long as it is suitable under the vulcanization conditions with the specific olefinic rubber or combination of rubbers being used with the polyolefin. These curatives include sulphur, sulphur donors, metal oxides, resin systems, peroxide-based systems, hydrosilation with platinum or peroxide and the like both with and without accelerators and coagents. The terms fully vulcanized and completely vulcanized as used in the specification means that the rubber component to be vulcanized has been cured to a state in which the elastomeric properties of the cross-linked rubber are similar to those of the rubber in its conventional vulcanized state, apart from the thermoplastic elastomer composition. The degree of cure can be described in terms of gel content or, conversely, extractable components. Alternatively, the degree of cure may be expressed in terms of cross-link density.

Of course, the inventive compounds may also include other curatives and reinforcing and non-reinforcing aides, antioxidants, stabilizers, rubber processing oils, extender oils, lubricants, antiblocking agents, antistatic agents, waxes, foaming agents, pigments, flame retardants and any of the other processing aids known in the rubber compounding art.

In a particularly preferred form of the invention, as described in U.S. Pat. No. 5,290,886, herein incorporated by reference, it may be desirable to add a certain low to medium molecular weight (less than 10,000) organic ester or alkyl ethyl ether ester plasticizer to the composition. The most suitable esters may include either aliphatic mono or diesters or alternatively oligomeric aliphatic esters or alkyl ether esters. For purposes of this invention, aliphatic tallate/oleate esters such as isooctyl tallate and n-butyl tallate are particularly preferred esters.

The amount of polyolefin thermoplastic found to provide useful compositions is generally from about 10 to 90 weight percent, based on the weight of the rubber and polyolefin. Preferably, the polyolefin thermoplastic content will range from about 10 to 40 percent by weight.

The following general procedure was used in the preparation of thermoplastic elastomers of the invention set forth in the examples of the following tables. The raw materials used in the compositions are more fully described in the chart following the tables.

TPEs were prepared by melt blending a rubber, a thermoplastic and optionally a diluent at T≦180° C. in a high shear device, in the presence of curatives such that mixing and vulcanization occurred simultaneously. Other additives, such as fillers, diluents (oil and plasticizer), antidegradants, etc., may be optionally added.

With respect to the examples of the invention, the above procedure was utilized and the results are set forth in the following tables.

TABLE 1

Examples of Ziegler and Metallocene EPDMs--and blends thereof--in Hard DVAs

| | Example # | | | | | | | | | |
|---|---|---|---|---|---|---|---|---|---|---|
| | 1 | 2 | 3 | 4 | 5 | 6 | 7 | 8 | 9 | 10 |
| 105B | 0 | 100 | 10 | 20 | 0 | 0 | 0 | 0 | 0 | 0 |
| 105B1 | 0 | 0 | 0 | 0 | 100 | 10 | 20 | 0 | 0 | 0 |
| 96A | 0 | 0 | 0 | 0 | 0 | 0 | 0 | 100 | 10 | 20 |
| V7500 | 100 | 0 | 90 | 80 | 0 | 90 | 80 | 0 | 90 | 80 |
| 51S07A | 219 | 219 | 219 | 219 | 219 | 219 | 219 | 219 | 219 | 219 |
| Sunpar 150 oil | 107 | 107 | 107 | 107 | 107 | 107 | 107 | 107 | 107 | 107 |
| SP-1045 | 7 | 7 | 7 | 7 | 7 | 7 | 7 | 7 | 7 | 7 |
| SnCl2 | 1.5 | 1.5 | 1.5 | 1.5 | 1.5 | 1.5 | 1.5 | 1.5 | 1.5 | 1.5 |
| Zinc oxide | 2 | 2 | 2 | 2 | 2 | 2 | 2 | 2 | 2 | 2 |
| Active black | 19.28 | 19.28 | 19.28 | 19.28 | 19.28 | 19.28 | 19.28 | 19.28 | 19.28 | 19.28 |
| EPDM Type | Ziegler | Metallocene | Blend | Blend | Metallocene | Blend | Blend | Metallocene | Blend | Blend |
| HARDNESS, Shore D | 47 | 47 | 48 | 48 | 46 | 47 | 46 | 47 | 46 | 47 |
| Stress at 50% strain, MPa | 10.21 | 10.19 | 10.69 | 10.74 | 9.95 | 10.08 | 10.65 | 9.93 | 10.03 | 10.11 |
| Stress at 100% strain, MPa | 11.31 | 11.21 | 11.82 | 11.68 | 11.04 | 11.20 | 11.90 | 10.52 | 11.23 | 11.32 |
| Stress at 200% strain, MPa | 12.91 | 12.60 | 13.50 | 13.11 | 12.50 | 12.84 | 13.70 | 11.56 | 13.03 | 13.12 |
| Tensile Strength, MPa | 19.60 | 19.89 | 19.79 | 19.11 | 19.92 | 18.39 | 19.92 | 19.56 | 20.12 | 20.61 |
| Elongation at break, % | 461 | 528 | 434 | 442 | 542 | 423 | 428 | 548 | 450 | 466 |
| Toughness, MPa | 63.35 | 73.76 | 61.11 | 60.87 | 75.34 | 56.01 | 61.00 | 72.68 | 62.06 | 65.62 |
| Tension Set, % | 35 | 41 | 35 | 36 | 40 | 34 | 35 | 38 | 35 | 35 |
| % Weight Gain | 55.97 | 58.56 | 49.92 | 54.87 | 58.12 | 50.25 | 48.86 | 53.81 | 49.11 | 55.05 |
| Compression Set % | 59 | 60 | 61 | 63 | 61 | 57 | 58 | 64 | 57 | 59 |

TABLE 2

EXAMPLES OF ZIEGLER AND METALLOCENE EPDMs--AND BLENDS THEREOF--IN SOFT DVAS

| | Example # | | | | | | | | | |
|---|---|---|---|---|---|---|---|---|---|---|
| | 11 | 12 | 13 | 14 | 15 | 16 | 17 | 18 | 19 | 20 |
| 105B | 0 | 100 | 10 | 20 | 0 | 0 | 0 | 0 | 0 | 0 |
| 105B1 | 0 | 0 | 0 | 0 | 100 | 10 | 20 | 0 | 0 | 0 |
| RUN 96 | 0 | 0 | 0 | 0 | 0 | 0 | 0 | 100 | 10 | 20 |
| V7500 | 100 | 0 | 90 | 80 | 0 | 90 | 80 | 0 | 0 | 0 |
| 51S07A | 59 | 59 | 59 | 59 | 59 | 59 | 59 | 59 | 59 | 59 |
| Sunpar 150 oil | 107 | 107 | 107 | 107 | 107 | 107 | 107 | 107 | 107 | 107 |
| SP-1045 | 7 | 7 | 7 | 7 | 7 | 7 | 7 | 7 | 7 | 7 |

TABLE 2-continued

EXAMPLES OF ZIEGLER AND METALLOCENE EPDMs--AND BLENDS THEREOF--IN SOFT DVAS

| | Example # | | | | | | | | | |
|---|---|---|---|---|---|---|---|---|---|---|
| | 11 | 12 | 13 | 14 | 15 | 16 | 17 | 18 | 19 | 20 |
| SnCl2 | 1.5 | 1.5 | 1.5 | 1.5 | 1.5 | 1.5 | 1.5 | 1.5 | 1.5 | 1.5 |
| Zinc oxide | 2 | 2 | 2 | 2 | 2 | 2 | 2 | 2 | 2 | 2 |
| Active black | 19.28 | 19.28 | 19.28 | 19.28 | 19.28 | 19.28 | 19.28 | 19.28 | 19.28 | 19.28 |
| EPDM Type | Ziegler | Metallocene | Blend | Blend | Metallocene | Blend | Blend | Metallocene | Blend | Blend |
| HARDNESS, Shore A | 73 | 73 | 72 | 73 | 72 | 73 | 73 | 71 | 71 | 72 |
| Stress at 50% strain, MPa | 2.93 | 3.06 | 3.19 | 3.11 | 2.94 | 3.06 | 3.20 | 2.77 | 2.83 | 2.69 |
| Stress at 100% strain, MPa | 4.28 | 4.51 | 4.68 | 4.49 | 4.37 | 4.44 | 4.68 | 4.04 | 4.16 | 3.95 |
| Stress at 200% strain, MPa | 6.65 | 7.25 | 7.49 | 6.99 | 6.92 | 6.98 | 7.30 | 6.28 | 6.69 | 6.34 |
| Tensile Strength, MPa | 11.74 | 9.62 | 8.93 | 9.25 | 11.97 | 9.09 | 8.69 | 10.22 | 8.38 | 8.02 |
| Elongation at break, % | 369 | 276 | 250 | 278 | 359 | 279 | 257 | 352 | 260 | 264 |
| Toughness, MPa | 23.51 | 15.19 | 13.23 | 15.03 | 23.38 | 15.06 | 13.63 | 20.19 | 12.68 | 12.27 |
| Tension Set, % | 10 | 10 | 10 | 10 | 10 | 8 | 10 | 8 | 8 | 8 |
| % Weight Gain | 79 | 98 | 86 | 95 | 97 | 91 | 91 | 91 | 91 | 95 |
| Compression Set % | 30 | 29 | 30 | 33 | 31 | 32 | 34 | 31 | 33 | 32 |

TABLE 3

Examples of Metallocene EPR'S in DVA's

| | Example # | | | | | | | | | |
|---|---|---|---|---|---|---|---|---|---|---|
| | 21 | 22 | 23 | 24 | 25 | 26 | 27 | 28 | 29 | 30 |
| | % | % | % | % | % | % | % | % | % | % |
| RG7034 | 100.00 | 100.00 | 98.91 | 97.85 | 97.85 | 95.80 | 100.00 | 97.85 | 95.80 | 95.80 |
| 19397-36A | 0.00 | 0.00 | 1.09 | 2.15 | 2.15 | 4.20 | 0.00 | 0.00 | 0.00 | 0.00 |
| 19397-36B | 0.00 | 0.00 | 0.00 | 0.00 | 0.00 | 0.00 | 0.00 | 2.15 | 4.20 | 4.20 |
| | 100.00 | 100.00 | 100.00 | 100.00 | 100.00 | 100.00 | 100.00 | 97.85 | 95.80 | 95.80 |
| | phr | phr | phr | phr | phr | phr | phr | phr | phr | phr |
| RG7034 | 455.74 | 455.74 | 455.74 | 455.74 | 455.74 | 455.74 | 455.74 | 455.74 | 455.74 | 455.74 |
| 19397-36A | 0 | 0 | 5 | 10 | 10 | 20 | 0 | 0 | 0 | 0 |
| 19397-36B | 0 | 0 | 0 | 0 | 0 | 0 | 0 | 10 | 20 | 20 |
| | 455.74 | 455.74 | 460.74 | 465.74 | 465.74 | 475.74 | 455.74 | 465.74 | 475.74 | 475.74 |
| RG7034 | 230.00 | 230.00 | 227.50 | 225.06 | 225.06 | 220.33 | 230.00 | 225.06 | 220.33 | 220.33 |
| 19397-36A | 0.00 | 0.00 | 2.50 | 4.94 | 4.94 | 9.67 | 0.00 | 0.00 | 0.00 | 0.00 |
| 19397-36B | 0.00 | 0.00 | 0.00 | 0.00 | 0.00 | 0.00 | 0.00 | 4.94 | 9.67 | 9.67 |
| | 230.00 | 230.00 | 230.00 | 230.00 | 230.00 | 230.00 | 230.00 | 225.06 | 220.33 | 220.33 |
| Hardness, Shore D | 43 | 45 | 45 | 44 | 42 | 44 | 43 | 44 | 42 | 44 |
| 100% Modulus, MPa | 10.31 | 10.39 | 10.44 | 10.02 | 10.88 | 9.90 | 10.31 | 10.07 | 10.21 | 9.87 |
| Tensile Strength, MPa | 19.2 | 17.33 | 17.71 | 19.32 | 18.85 | 18.56 | 19.2 | 18.34 | 18.23 | 15.85 |
| Elongation at Break, % | 448 | 389 | 386 | 456 | 418 | 451 | 448 | 441 | 429 | 357 |
| Toughness, MPa | 57.6 | 47.92 | 47.58 | 58.22 | 54.7 | 56.41 | 57.6 | 54.84 | 53.81 | 40.73 |
| Tension Set, % | 35 | 30 | 33 | 30 | 35? | 30 | 35 | 35 | 33 | 30 |
| Notched Izod at −40 C., | 699 +/− 86 | 862 +/− 82 | 116 +/− 20 | 828 +/− 62 | 501 +/− 99* | 135 +/− 16 | 699 +/− 86 | 817 +/− 53 | 809 +/− 99 | 112 +/− 16 |
| | NACB 156 +/− 41 | NACB 193 +/− 20 | CB | NACB | ACB 808 +/− 22 NACB 165 CB* | CB | NACB 156 +/− 41 | NACB | NACB 139 +/− 43 CB | CB |

**3 samples; ACB almost complete break
*1 sample; Complete break

TABLE 4

Examples of Ziegler and Metallocene EPDMs in soft DVAs

| | Example # | | | | | | | | | | |
|---|---|---|---|---|---|---|---|---|---|---|---|
| | 31 | 32 | 33 | 34 | 35 | 36 | 37 | 38 | 39 | 40 | 43 |
| Polymer Type, Ziegler (Z)/Metallocene (M) | Z | M | M | M | Z | M | M | M | M | M | Z |
| Ethylene, C2 % | 52 | 18 | 17.4 | 17 | 52 | 30 | 31 | 32 | 33 | 40 | 65 |
| ENB, % | 5.7 | 3.1 | 2.85 | 2.5 | 5.7 | 3.2 | 6.7 | 4.2 | 5.8 | 3 | 4.5 |
| V7500, C2 = 52%, ML125C = 91; ENB = 5.7% | 100.00 | | | | 100.00 | | | | | | |
| 105B; C2 = 18%, ML125C = 10; ENB = 3.1% | | 100.00 | | | | | | | | | |

TABLE 4-continued

Examples of Ziegler and Metallocene EPDMs in soft DVAs

| | Example # | | | | | | | | | | |
|---|---|---|---|---|---|---|---|---|---|---|---|
| | 31 | 32 | 33 | 34 | 35 | 36 | 37 | 38 | 39 | 40 | 43 |
| 105B1; C2 = 17.4%; ML125C = 20; ENB = 2.85% | | | 100.00 | | | | | | | | |
| 96A; C2 = 17%; ML125C = 100; ENB = 2.5% | | | | 100.00 | | | | | | | |
| 209B; C2 = 30.43%; ML125C = 30; ENB = 3.16% | | | | | | 100.00 | | | | | |
| 209C; C2 = 31.52%; ML125C = 37.4; ENB = 6.73% | | | | | | | 100.00 | | | | |
| 208B; C2 = 31.92%; ML125C = 43.4; ENB = 4.2% | | | | | | | | 100.00 | | | |
| 208C; C2 = 32.88%; ML125C = 58.2; ENB = 5.8% | | | | | | | | | 100.00 | | |
| 88B; C2 = 40%; ML125C = 102; ENB 3% | | | | | | | | | | 100.00 | |
| VX4779 (75 phr oil); C2 = 65%, ML125C = 68; ENB = 4.5% | | | | | | | | | | | 175.00 |
| Rexene 51S07A, 0.7 MFR PP | 59.10 | 59.10 | 59.10 | 59.10 | 59.10 | 59.10 | 59.10 | 59.10 | 59.10 | 59.10 | 59.10 |
| Sunpar 150 | 107.00 | 107.00 | 107.00 | 107.00 | 107.00 | 107.00 | 107.00 | 107.00 | 107.00 | 107.00 | 32.00 |
| SP-1045 | 7.00 | 7.00 | 7.00 | 7.00 | 7.00 | 7.00 | 7.00 | 7.00 | 7.00 | 7.00 | 7.00 |
| SnCl2 Dihydrate | 1.50 | 1.50 | 1.50 | 1.50 | 1.50 | 1.50 | 1.50 | 1.50 | 1.50 | 1.50 | 1.50 |
| Zinc Oxide | 2.00 | 2.00 | 2.00 | 2.00 | 2.00 | 2.00 | 2.00 | 2.00 | 2.00 | 2.00 | 2.00 |
| Active Black | 19.28 | 19.28 | 19.28 | 19.28 | 19.28 | 19.28 | 19.28 | 19.28 | 19.28 | 19.28 | 19.28 |
| Formula Wt. | 295.88 | 295.88 | 295.88 | 295.88 | 295.88 | 295.88 | 295.88 | 295.88 | 295.88 | 295.88 | 295.88 |
| Hardness, Shore A | 73 | 73 | 72 | 71 | 71 | 66 | 69 | 72 | 71 | 73 | 74 |
| Stress at 50% strain, MPa | 2.93 | 3.06 | 2.94 | 2.77 | 3.37 | 3.07 | 3.13 | 3.22 | 3.13 | 3.18 | 3.81 |
| Stress at 200% strain, MPa | 6.65 | 7.25 | 6.92 | 6.28 | 8.01 | 7.22 | 7.53 | 7.96 | 7.59 | 6.73 | 7.16 |
| Stress at 100% strain, MPa | 4.28 | 4.51 | 4.37 | 4.04 | 4.96 | 4.49 | 4.65 | 4.83 | 4.65 | 4.47 | 5.00 |
| Tensile Strength, MPa | 11.74 | 9.62 | 11.97 | 10.22 | 11.41 | 9.08 | 10.94 | 11.17 | 10.17 | 10.92 | 13.46 |
| Elongation at break, % | 369 | 276 | 359 | 352 | 296 | 267 | 298 | 294 | 277 | 353 | 374 |
| Toughness, MPa | 23.51 | 15.19 | 23.38 | 20.19 | 19.12 | 14.31 | 18.17 | 18.58 | 15.95 | 22.00 | 26.92 |
| Tension Set, % | 10 | 10 | 10 | 8 | 10 | 13 | 10 | 8 | 10 | 8 | 10 |
| % Weight Gain, 22 h at 125 C. | 80 | 98 | 98 | 91 | 76 | 100 | 84 | 77 | 85 | 84 | |
| Compression Set %, 24 h at 100 C. | 30 | 29 | 31 | 31 | | | | | | | |

TABLE 5

Evaluation of Ziegler and Metallocene EPDMs in DVAs

| | Example # | | | | | | | | | | |
|---|---|---|---|---|---|---|---|---|---|---|---|
| | 44 | 45 | 46 | 47 | 48 | 49 | 50 | 51 | 52 | 53 | 56 |
| Ethylene, C2 % | 52 | 18 | 17.4 | 17 | 52 | 43 | 31 | 32 | 33 | 40 | 65 |
| ENB, % | 5.7 | 3.1 | 2.85 | 2.5 | 5.7 | 3.2 | 6.7 | 4.2 | 5.8 | 3 | 4.5 |
| V7500, C2 = 52%, ML125C = 91; ENB = 5.7% | 100.00 | | | | 100.00 | | | | | | |
| 105B; C2 = 18%, ML125C = 10; ENB = 3.1% | | 100.00 | | | | | | | | | |
| 105B1; C2 = 17.4%; ML125C = 20; ENB = 2.85% | | | 100.00 | | | | | | | | |
| 96A; C2 = 17%; ML125C = 100; ENB = 2.5% | | | | 100.00 | | | | | | | |
| 209B; C2 = 30.43%; ML125C = 30; ENB = 3.16% | | | | | | 100.00 | | | | | |
| 209C; C2 = 31.52%; ML125C = 37.4; ENB = 6.73% | | | | | | | 100.00 | | | | |
| 208B; C2 = 31.92%; ML125C = 43.4; ENB = 4.2% | | | | | | | | 100.00 | | | |
| 208C; C2 = 32.88%; ML125C = 58.2; ENB = 5.8% | | | | | | | | | 100.00 | | |
| 88B; C2 = 40%; ML125C = 102; ENB 3% | | | | | | | | | | 100.00 | |
| VX4779 (75 phr oil); C2 = 65%, ML125C = 68; ENB = 4.5% | | | | | | | | | | | 175.00 |
| Rexene 51S07A, 0.7 MFR PP | 219.10 | 219.10 | 219.10 | 219.10 | 219.10 | 219.10 | 219.10 | 219.10 | 219.10 | 219.10 | 219.10 |
| Sunpar 150 | 107.00 | 107.00 | 107.00 | 107.00 | 107.00 | 107.00 | 107.00 | 107.00 | 107.00 | 107.00 | 32.00 |
| SP-1045 | 7.00 | 7.00 | 7.00 | 7.00 | 7.00 | 7.00 | 7.00 | 7.00 | 7.00 | 7.00 | 7.00 |
| SnCl2 Dihydrate | 1.50 | 1.50 | 1.50 | 1.50 | 1.50 | 1.50 | 1.50 | 1.50 | 1.50 | 1.50 | 1.50 |
| Zinc Oxide | 2.00 | 2.00 | 2.00 | 2.00 | 2.00 | 2.00 | 2.00 | 2.00 | 2.00 | 2.00 | 2.00 |
| Active Black | 19.28 | 19.28 | 19.28 | 19.28 | 19.28 | 19.28 | 19.28 | 19.28 | 19.28 | 19.28 | 19.28 |
| Formula Wt. | 455.88 | 455.88 | 455.88 | 455.88 | 455.88 | 455.88 | 455.88 | 455.88 | 455.88 | 455.88 | 525.38 |

TABLE 5-continued

Evaluation of Ziegler and Metallocene EPDMs in DVAs

| | Example # | | | | | | | | | | |
|---|---|---|---|---|---|---|---|---|---|---|---|
| | 44 | 45 | 46 | 47 | 48 | 49 | 50 | 51 | 52 | 53 | 56 |
| Hardness, Shore D | 44 | 45 | 45 | 44 | 43 | 38 | 39 | 40 | 39 | 43 | 45 |
| Stress at 50% strain, MPa | 9.64 | 9.50 | 9.84 | 9.15 | 10.20 | 9.96 | 10.39 | 9.91 | 9.75 | 9.98 | 10.79 |
| Stress at 100% strain, MPa | 10.76 | 10.69 | 11.00 | 10.11 | 11.65 | 11.31 | 11.68 | 11.20 | 11.01 | 10.95 | 11.45 |
| Stress at 200% strain, MPa | 12.47 | 12.72 | 12.84 | 11.79 | 13.81 | 13.50 | 13.75 | 13.18 | 12.91 | 12.48 | 12.92 |
| Tensile Strength, MPa | 20.19 | 17.70 | 22.49 | 20.25 | 23.46 | 17.83 | 21.14 | 19.54 | 19.29 | 22.42 | 22.53 |
| Elongation at break, % | 499 | 391 | 495 | 488 | 464 | 364 | 436 | 432 | 449 | 537 | 455 |
| Toughness, MPa | 69.00 | 50.53 | 72.29 | 64.76 | 69.58 | 47.61 | 63.01 | 59.42 | 60.77 | 77.34 | 65.65 |
| Tension Set, % | 35 | 40 | 38 | 35 | 35 | 43 | 43 | 35 | 40 | 40 | 43 |
| % Weight Gain | 57 | 62 | 62 | 60 | 53 | 59 | 61 | 53 | 54 | 56 | 52 |
| Compression Set % | 57 | 61 | 60 | 61 | 59 | 61 | 60 | 59 | 59 | 65 | 63 |
| Notched Izod at −40 C., J/m | 154 +/− 7 | 24 +/− 2 | 24 +/− 2 | 28 +/− 2 | | | | | | | |

TABLE 6

EXAMPLES OF ZIEGLER EPDM WITH METALLOCENE PP DVAs AND BLENDS OF METALLOCENE-ZIEGLER PP

| | Example # | | | | | | |
|---|---|---|---|---|---|---|---|
| | 57 | 58 | 59 | 60 | 61 | 62 | 63 |
| | % | % | % | % | % | % | % |
| VISTALON 7500 | 38 | 38 | 38 | 38 | 38 | 0 | 0 |
| 2 Zno/1.5 SnCl2 BLEND | 1 | 1 | 1 | 1 | 1 | 0 | 0 |
| SP-1045 | 2 | 2 | 2 | 2 | 2 | 0 | 0 |
| SUNPAR 150M, | 40 | 40 | 40 | 40 | 40 | 0 | 0 |
| 51S07A PP, Ziegler, | 19 | 0 | 2 | 3 | 6 | 100 | 0 |
| Metallocene PP, 3 MFR | 0 | 19 | 17 | 16 | 13 | 0 | 100 |
| TOTAL | 100 | 100 | 100 | 100 | 100 | 100 | 100 |
| DSC at 10° min | | | | | | | |
| Crystallization Temp, ° C. | 94.03 | 89.02 | 94.83 | 95.06 | 95.97 | 106.13 | 98.96 |
| Area, J/g | 21.54 | 18.28 | 19.11 | 19.84 | 20.35 | 95.23 | 95.36 |
| Melting Temp, ° C. | 154.55 | 138.47 | 140.12 | 142.48 | 145.08 | 166.19 | 152.01 |
| Area, J/g | 21.18 | 18.57 | 19.00 | 19.20 | 19.93 | 96.38 | 95.55 |
| Hardness, Shore A | 64 | 63 | 64 | 64 | 64 | | |
| 100% Modulus, MPa | 2.65 | 2.64 | 2.64 | 2.66 | 2.72 | | |
| Tensile Strength, MPa | 5.70 | 7.02 | 6.95 | 6.26 | 6.81 | | |
| Elongation at break, % | 312 | 367 | 353 | 324 | 349 | | |
| Tension Set, % | 9 | 7 | 7 | 7 | 7 | | |
| Compression Set, % 22 h at 100 C. | 34 | 33 | 31 | 31 | 31 | | |
| Weight Gain, %, 24 h @ 125 C. | 131 | 192 | 167 | 152 | 142 | | |
| Weight Gain, %, | 134 | 191 | 169 | 156 | 140 | | |

TABLE 7

DVAs WITH BLENDS OF METALLOCENE PP AND ZIEGLER ISOTACTIC PP

| | Example # | | | | | | | |
|---|---|---|---|---|---|---|---|---|
| | 64 | 65 | 66 | 67 | 68 | 69 | 70 | 71 |
| | % | % | % | % | % | % | % | % |
| VISTALON 7500 | 38 | 38 | 38 | 38 | 38 | 38 | 38 | 38 |
| 2 Zno/1.5 SnCl2 BLEND | 1 | 1 | 1 | 1 | 1 | 1 | 1 | 1 |
| SP-1045 | 2 | 2 | 2 | 2 | 2 | 2 | 2 | 2 |
| SUNPAR 150M, | 40 | 40 | 40 | 40 | 40 | 40 | 40 | 40 |
| 51S07A PP, Ziegler, 0.7 MFR | 19 | 0 | 2 | 3 | 6 | 13 | 16 | 17 |
| Metallocene PP, 3MFR | 0 | 19 | 17 | 16 | 13 | 6 | 3 | 2 |
| TOTAL | 100 | 100 | 100 | 100 | 100 | 100 | 100 | 100 |
| Crystallization Temp, ° C. | 103.42 | 91.38 | 92.46 | 99.81 | 96.18 | 108.58 | 99.54 | 108.49 |
| Melting Temp, ° C. | 154.08 | 140.28 | 142.26 | 142.85 | 144.85 | 150.45 | 152.06 | 152.62 |
| Hardness, Shore A | 64 | 63 | 62 | 63 | 63 | 64 | 64 | 64 |
| 100% Modulus, MPa | 2.63 | 2.64 | 2.60 | 2.63 | 2.74 | 2.82 | 2.86 | 2.94 |
| Tensile Strength, MPa | 6.75 | 6.46 | 5.72 | 5.95 | 7.53 | 7.33 | 6.77 | 7.41 |

TABLE 7-continued

DVAs WITH BLENDS OF METALLOCENE PP AND ZIEGLER ISOTACTIC PP

| | Example # | | | | | | | |
|---|---|---|---|---|---|---|---|---|
| | 64 | 65 | 66 | 67 | 68 | 69 | 70 | 71 |
| Elongation at break, % | 304 | 286 | 256 | 262 | 307 | 298 | 272 | 286 |
| Compression Set, % 22 h at 100 C. | 35 | 41 | 37 | 38 | 37 | 33 | 32 | 35 |
| Weight Gain, %, 24 h @ 125 C. | 93 | 113 | 118 | 107 | 107 | 99 | 98 | 96 |

TABLE 8

Evaluation of Metallocene EP(D)M is in Cured Thermoplastic Elastomers (TPEs)

| | Example # | | | | | | |
|---|---|---|---|---|---|---|---|
| | 72 | 73 | 74 | 75 | 76 | 77 | 78 |
| V7500 | 100.00 | 90.00 | 80.00 | 60.00 | 90.00 | 80.00 | 60.00 |
| 105B C2 = 18% | 0.00 | 10.00 | 20.00 | 40.00 | 0.00 | 0.00 | 0.00 |
| 105B1, C2 = 17.4% | 0.00 | 0.00 | 0.00 | 0.00 | 10.00 | 20.00 | 40.00 |
| REXENE 51S07A, 0.7 MFR | 59.10 | 59.10 | 59.10 | 59.10 | 59.10 | 59.10 | 59.10 |
| Sunpar 150 | 80.25 | 80.25 | 80.25 | 80.25 | 80.25 | 80.25 | 80.25 |
| | 239.35 | 239.35 | 239.35 | 239.35 | 239.35 | 239.35 | 239.35 |
| Sunpar 150 | 26.75 | 26.75 | 26.75 | 26.75 | 26.75 | 26.75 | 26.75 |
| SP1045 | 7.00 | 7.00 | 7.00 | 7.00 | 7.00 | 7.00 | 7.00 |
| Sncl2 dihydrate | 1.50 | 1.50 | 1.50 | 1.50 | 1.50 | 1.50 | 1.50 |
| Zinc oxide | 2.00 | 2.00 | 2.00 | 2.00 | 2.00 | 2.00 | 2.00 |
| High Cure | 356.85 | 356.85 | 356.85 | 356.85 | 356.85 | 356.85 | 356.85 |
| Hardness, Shore A | 69 | 70 | 69 | 68 | 69 | 70 | 70 |
| Stress at 50% strain, Mpa | 2.67 | 2.71 | 2.74 | 2.85 | 2.74 | 2.90 | 2.87 |
| Stress at 100% strain, Mpa | 4.07 | 4.04 | 4.07 | 4.19 | 4.09 | 4.29 | 4.24 |
| Stress at 200% strain, Mpa | 6.91 | 6.62 | 6.67 | 6.70 | 6.73 | 6.95 | 6.86 |
| Tensile Strength, Mpa | 8.78 | 10.21 | 9.32 | 8.34 | 8.39 | 9.81 | 9.26 |
| Elongation at break, % | 258 | 315 | 286 | 258 | 256 | 291 | 281 |
| Toughness, Mpa | 12.56 | 17.50 | 14.86 | 12.59 | 12.29 | 16.07 | 14.85 |
| Tension, Set % | 8 | 8 | 8 | 10 | 8 | 10 | 10 |
| Oil Swell, % | 87 | 94 | 95 | 93 | 92 | 93 | 99 |
| Sunpar 150 | 26.75 | 26.75 | 26.75 | 26.75 | | | |
| SP1045 | 1.50 | 1.50 | 1.50 | 1.50 | | | |
| Sncl2 dihydrate | 1.00 | 1.00 | 1.00 | 1.00 | | | |
| Zinc oxide | 2.00 | 2.00 | 2.00 | 2.00 | | | |
| Low Cure | 264.09 | 256.48 | 256.19 | 257.83 | | | |
| Hardness, Shore A | 60 | 61 | 66 | 66 | | | |
| Stress at 50% strain, Mpa | 1.90 | 2.04 | 2.17 | 2.53 | | | |
| Stress at 100% strain, Mpa | 2.61 | 2.76 | 2.89 | 3.40 | | | |
| Stress at 200% strain, Mpa | 3.86 | 3.92 | 4.06 | 4.66 | | | |
| Tensile Strength, MPa | 5.08 | 5.65 | 6.29 | 7.29 | | | |
| Elongation at break, % | 313 | 380 | 421 | 489 | | | |
| Toughness, MPa | 10.16 | 13.98 | 17.06 | 24.07 | | | |
| Tension Set, % | 10 | 13 | 13 | 15 | | | |
| Oil Swell % | 182 | 178 | 191 | 184 | | | |

TABLE 9

EFFECT OF POLYPROPYLENE TYPE IN DVA's

| | Example # | | | | | | | | | | | |
|---|---|---|---|---|---|---|---|---|---|---|---|---|
| | 79 | 80 | 81 | 82 | 83 | 84 | 85 | 86 | 87 | 88 | 89 | 90 |
| Polypropylene Type | Z | Z | Z | Z | Z | Z | Z | Z | M | M | Z | Z |
| MFR, g/10 min | 0.7 | 0.7 | 0.7 | 0.7 | 20 | 20 | 5 | 5 | 5.6 | 5.6 | 0.7 | 0.7 |
| | low MFR | low MFR | low MFR | low MFR | high MFR | high MFR | med MFR | med MFR | med MFR | med MFR | low MFR | low MFR |
| CURE STATE | partial cure | full cure | full cure | part cure | full cure | full cure | full cure | full cure | full cure | full cure | full cure | peroxide cure |
| DILUENT | S150 | S150 | no oil | no oil | S150 | no oil | S150 | no oil | S150 | no oil | P100 | S150 |
| INGREDIENT | phr | phr | phr | phr | phr | phr | phr | phr | phr | phr | phr | phr |
| V7500 | 100.00 | 100.00 | 100.00 | 100.00 | 100.00 | 100.00 | 100.00 | 100.00 | 100.00 | 100.00 | 100.00 | 100.00 |
| REXENE 51S07A, MFR 0.7 | 50.00 | 50.00 | 50.00 | 50.00 | 0.00 | 0.00 | 0.00 | 0.00 | 0.00 | 0.00 | 50.00 | 50.00 |
| ARISTECH FP200, MFR 20 | 0.00 | 0.00 | 0.00 | 0.00 | 50.00 | 50.00 | 0.00 | 0.00 | 0.00 | 0.00 | 0.00 | 0.00 |

TABLE 9-continued

EFFECT OF POLYPROPYLENE TYPE IN DVA's

| | Example # | | | | | | | | | | | |
|---|---|---|---|---|---|---|---|---|---|---|---|---|
| | 79 | 80 | 81 | 82 | 83 | 84 | 85 | 86 | 87 | 88 | 89 | 90 |
| SHELL PP DX5A15H MFR 5.0 | 0.00 | 0.00 | 0.00 | 0.00 | 0.00 | 0.00 | 50.00 | 50.00 | 0.00 | 0.00 | 0.00 | 0.00 |
| PP 18897-066-001, MFR 5.6 | 0.00 | 0.00 | 0.00 | 0.00 | 0.00 | 0.00 | 0.00 | 0.00 | 50.00 | 50.00 | 0.00 | 0.00 |
| SUNPAR 150M | 107.00 | 107.00 | 0.00 | 0.00 | 107.00 | 0.00 | 107.00 | 0.00 | 107.00 | 0.00 | 0.00 | 0.00 |
| P100 | 0.00 | 0.00 | 0.00 | 0.00 | 0.00 | 0.00 | 0.00 | 0.00 | 0.00 | 0.00 | 107.00 | 0.00 |
| HT-100 | 0.00 | 0.00 | 0.00 | 0.00 | 0.00 | 0.00 | 0.00 | 0.00 | 0.00 | 0.00 | 0.00 | 107.00 |
| SP-1045 | 1.50 | 7.00 | 7.00 | 1.50 | 7.00 | 7.00 | 7.00 | 7.00 | 7.00 | 7.00 | 7.00 | 1.50 |
| SnCL2 DIHYDRATE | 1.00 | 1.50 | 1.50 | 1.00 | 1.50 | 1.50 | 1.50 | 1.50 | 1.50 | 1.50 | 1.50 | 1.00 |
| ZINC OXIDE | 2.00 | 2.00 | 2.00 | 2.00 | 2.00 | 2.00 | 2.00 | 2.00 | 2.00 | 2.00 | 2.00 | 2.00 |
| VULCUP 40KE | 0.00 | 0.00 | 0.00 | 0.00 | 0.00 | 0.00 | 0.00 | 0.00 | 0.00 | 0.00 | 0.00 | 2.54 |
| PERKALINK | 0.00 | 0.00 | 0.00 | 0.00 | 0.00 | 0.00 | 0.00 | 0.00 | 0.00 | 0.00 | 0.00 | 3.30 |
| Total phr | 261.50 | 267.50 | 160.50 | 154.50 | 267.50 | 160.50 | 267.50 | 160.50 | 267.50 | 160.50 | 267.50 | 267.34 |
| | part cure std. poly low MFR | full cure std. poly low MFR | full cure std. poly low MFR no oil | part cure std. poly low MFR no oil | full cure std. poly high MFR | full cure std. poly high MFR no oil | full cure SHELL med MFR | full cure SHELL med MFR no oil | full cure metall. PP med MFR | full cure metall. PP med MFR no oil | full cure std. poly low MFR P100 | peroxide cure std. poly low MFR |
| HARDNESS, Shore A | 56 | 63 | 87 | 87 | 65 | 88 | 65 | 86 | 65 | 85 | 62 | 55 |
| Stress at 50% strain, MPa | 1.37 | 2.09 | 6.52 | 6.14 | 2.06 | 6.22 | 2.06 | 5.88 | 2.13 | 5.84 | 1.84 | 1.49 |
| Stress at 100% strain, MPa | 1.85 | 3.30 | 9.08 | 8.14 | 3.37 | 8.73 | 3.23 | 8.22 | 3.44 | 8.48 | 2.87 | 2.16 |
| Stress at 200% strain, MPa | 2.67 | 5.79 | 13.75 | 10.76 | — | 13.26 | 5.71 | 12.44 | 6.21 | 13.20 | 4.89 | 3.27 |
| Tensile Strength, MPa | 2.87 | 6.28 | 16.66 | 11.46 | 6.20 | 20.50 | 5.70 | 23.16 | 7.54 | 16.56 | 5.16 | 4.03 |
| Elongation at break % | 257 | 218 | 250 | 234 | 201 | 294 | 200 | 337 | 240 | 251 | 214 | 290 |
| Toughness, MPa | 5.21 | 7.67 | 25.32 | 19.39 | 6.94 | 33.69 | 6.84 | 39.21 | 9.64 | 24.05 | 6.40 | 7.51 |
| Tension Set, % | 13 | 6 | 12 | 19 | 5 | 13 | 5 | 12 | 5 | 12 | 5 | 10 |
| Compression Set % 22 h @ 100 C. | 55 | 21 | 24 | 40 | 22 | 26 | 23 | 23 | 22 | 22 | 21 | 35 |
| Weight Gain % IRM 903 24 h @ 125 C. | 209 | 92 | 153 | 230 | 90 | 131 | 92 | 138 | 83 | 131 | 104 | 203 |
| ACR Viscosity, Poise | 1288 | 5301 | * | * | 1676 | * | 1556 | * | 1951 | * | 2157 | 2485 |

TABLE 10

EFFECT OF CURE STATE AND POLYPROPYLENE TYPE ON PROPERTIES OF DVAS

| | Example # | | | | | |
|---|---|---|---|---|---|---|
| | 91 | 92 | 93 | 94 | 95 | 96 |
| INGREDIENTS | | | | | | |
| VISTALON 7500 | 100.00 | 100.00 | 100.00 | 100.00 | 100.00 | 100.00 |
| REXENE 51S07A, MFR = 0.7, (Z) | 50.00 | 50.00 | — | — | — | — |
| SHELL PP DX5A15H, MFR = 5, (Z) | — | — | 50.00 | — | — | — |
| PP 18897-066-005** MFR = 6.7, (M) (M) | — | — | — | 50.00 | — | — |
| PP 18897-066-006, MFR = 30, (M) | — | — | — | — | 50.00 | — |
| Aristech FP-200F, MFR = 20, (Z) | — | — | — | — | — | 50.00 |
| PROPERTIES | | | | | | |
| ACR Viscosity, Poise | 1039 | 2299 | 735 | 1366 | 1579 | 1749 |
| HARDNESS, Shore A | 65 | 67 | 65 | 64 | 63 | 62 |
| Specific Gravity | 0.882 | 0.884 | 0.884 | 0.883 | 0.883 | 0.884 |
| Stress at 50% strain, MPa | 2.10 | 2.48 | 2.20 | 1.84 | 1.90 | 1.86 |
| Stress at 100% strain, MPa | 2.76 | 3.52 | 3.09 | 2.62 | 2.73 | 2.52 |
| Stress at 200% strain, MPa | 4.06 | 5.93 | 4.98 | 4.13 | 4.42 | 3.81 |
| Tensile Strength, MPa | 6.79 | 9.37 | 7.72 | 7.76 | 6.19 | 4.87 |
| Elongation at break, % | 379 | 297 | 302 | 365 | 283 | 271 |
| Toughness, MPa | 15.08 | 14.32 | 12.51 | 14.68 | 9.78 | 8.09 |
| Tension Set, % | 15 | 10 | 10 | 10 | 10 | 10 |
| % Weight Gain | 173.09 | 97.74 | 111.08 | 123.21 | 135.24 | 156.89 |
| Compression Set % | 50 | 38 | 38 | 35 | 36 | 45 |

TABLE 10-continued

EFFECT OF CURE STATE AND POLYPROPYLENE TYPE ON PROPERTIES OF DVAS

| | Example # | | | | | |
|---|---|---|---|---|---|---|
| | 91 | 92 | 93 | 94 | 95 | 96 |
| *-Common Ingredients | | | | | | |
| SUNPAR 150M | 107.00 | 107.00 | 107.00 | 107.00 | 107.00 | 107.00 |
| SP-1045 | 1.50 | 5.00 | 5.00 | 5.00 | 5.00 | 5.00 |
| SnCL2 DIHYDRATE | 1.00 | 1.00 | 1.00 | 1.00 | 1.00 | 1.00 |
| ZINC OXIDE | 2.00 | 2.00 | 2.00 | 2.00 | 2.00 | 2.00 |

TABLE 11

EVALUATION OF VARIOUS ZIEGLER AND METALLOCENE POLYPROPYLENES
(ex. 97–102 comprised of base phr: 100 V 7500; 107 P100; 59PP and a cure system of 1.26 Sncl$_2$; 7 Sp1045; 2 ZnO; 19.28 active black) (ex. 103-108 are identical except 219 PP)

| | Example # | | | | | | |
|---|---|---|---|---|---|---|---|
| | 97 Control | 98 HCPP | 99 Nuc homoPP | 100 HCPP | master 101 PP | 102 PP | 103 Control |
| Polypropylene type | AES PP | 4720 | 4702G | 19067-002-001 | 18897-066-001 | 18897-066-003 | AES PP |
| | | | | | | | Neat Polypropylene |
| Polymerization Type | Ziegler | Ziegler | Ziegler | Ziegler | Metallocene | Metallocene | Ziegler |
| MFR | 0.7 | 3 | 3 | 80 | 5.6 | 6.7 | 0.7 |
| Tm, C. | 161 | 162 | 166 | 161 | 158 | 151 | 161 |
| Delta Hf, J/g | 93 | 100 | 102 | 104 | 97 | 90 | 93 |
| Tc, C. | 111 | 112 | 125 | 116 | 116 | 111 | 111 |
| Delta Hc, J/g | 95 | 101 | 107 | 104 | 98 | 89 | 95 |
| HDT Neat Polypropylene, C. | 91.5 +/− 5.2 | 104.6 +/− 0.97 | 133.6 +/− 1.8 | 107.7 +/− 0.9 | 116 +/− 0.85 | 97.45 +/− 0.65 | 91.5 +/− 5.2 |
| 1% Sec Flex Mod, kpsi, Neat PP | 104,801 +/− 676 | 115,292 +/− 1120 | 186,656 +/− 1755 | 140,648 +/− 620 | 129,870 +/− 7531 | 128,204 +/− 4930 | 104,801 +/− 676 |
| | | | | | | | Dynamically Vulcanized Alloy |
| 1% Secant Flex Modulus, kpsi | | | | | | | 24,549 +/− 415 |
| 1% Flex Modulus, kpsi | | | | | | | 27,091 +/− 57 |
| Heat Distorsion Temperature, C. | | | | | | | 56.5 +/− 2.8 |
| Hardness, Shore A/(D) | 71 | 72 | 72 | 72 | 71 | 71 | 40 |
| Stress at 50% Strain MPa | 2.37 | 2.41 | 2.48 | 2.27 | 2.49 | 2.32 | 8.44 |
| Stress at 100% strain MPa | 3.54 | 3.55 | 3.76 | — | 3.74 | 3.42 | 9.64 |
| Stress at 200% strain, MPa | 5.27 | 5.61 | — | — | 5.91 | 5.4 | 11.42 |
| Tensile Strength, MPa | 7 | 6.68 | 5.6 | 3.11 | 8.05 | 7.39 | 15.02 |
| Elongation at break, % | 265 | 252 | 180 | 92 | 306 | 292 | 374 |
| Toughness, MPa | 10.97 | 10.06 | 6.14 | 1.88 | 14.69 | 12.6 | 41.5 |
| Tension Set, % | 10 | 10 | 10 | break | 10 | 10 | 33 |
| Compression Set, % 22 hrs @ 100 C. | 25 | 26 | 24 | 23 | 20 | 22 | 44 |
| Weight change, % Fluid #3, 24 hrs @ 125 C. | 95.4 | 81.5 | 75.8 | 81.8 | 80.2 | 114.6 | 58.6 |
| Notched Izod Impact at −40 C. me6055 | | | | | | | 655 +/− 45 NACB |

| | Example # | | | | |
|---|---|---|---|---|---|
| | 104 HCPP | 105 PP | 106 PP | let down 107 PP | 108 PP |
| Polypropylene type | 4722 | 4702G | 19067-002-001 | 18897-066-001 | 18897-066-003 |
| Polymerization Type | Ziegler | Ziegler | Ziegler | Metallocene | Metallocene |
| MFR | 3 | 3 | 80 | 5.6 | 6.7 |
| Tm, C. | 162 | 166 | 161 | 158 | 151 |
| Delta Hf, J/g | 100 | 102 | 104 | 97 | 90 |
| Tc, C. | 112 | 125 | 116 | 116 | 111 |
| Delta Hc, J/g | 101 | 107 | 104 | 98 | 89 |
| HDT Neat Polypropylene, C. | 104.6 +/− 0.97 | 133.6 +/− 1.8 | 107.7 +/− 0.9 | 116 +/− 0.85 | 97.45 +/− 0.65 |
| 1% Sec Flex Mod, kpsi, Neat PP | 115,292 +/− 1120 | 186,656 +/− 1755 | 140,648 +/− 6206 | 129,870 +/− 7531 | 128,204 +/− 4930 |

TABLE 11-continued

EVALUATION OF VARIOUS ZIEGLER AND METALLOCENE POLYPROPYLENES
(ex. 97–102 comprised of base phr: 100 V 7500; 107 P100; 59PP and a cure system of 1.26 $SnCl_2$;
7 Sp1045; 2 ZnO; 19.28 active black) (ex. 103-108 are identical except 219 PP)

|  | Dynamically Vulcanized Alloy | | Properties | | |
|---|---|---|---|---|---|
| 1% Secant Flex Modulus, kpsi | 25,352 +/− 875 | 25,923 +/− 1249 | 26,802 +/− 147 | 28,214 +/− 349 | 27,740 +/− 260 |
| 1% Flex Modulus, kpsi | 27,885 +/− 977 | 28,133 +/− 1351 | 29,628 +/− 65 | 31,501 +/− 463 | 30,985 +/− 643 |
| Heat Distorsion Temperature, C. | 58.3 +/− 0.8 | 58.0 +/− 1.4 | 56.1 +/− 1.1 | 57.4 +/− 1.0 | 57.1 +/− 2.0 |
| Hardness, Shore A/(D) | 40 | 40 | 38 | 41 | 40 |
| Stress at 50% Strain MPa | 8.69 | 8.87 | — | 8.89 | 8.32 |
| Stress at 100% strain MPa | 9.91 | 10.26 | — | 10.05 | 9.43 |
| Stress at 200% strain, MPa | 11.63 | 12.13 | — | 11.61 | 11.02 |
| Tensile Strength, MPa | 13.71 | 13.91 | 7.01 | 14.86 | 17.64 |
| Elongation at break, % | 312 | 297 | 40 | 370 | 482 |
| Toughness, MPa | 33.14 | 32.39 | 2.41 | 41.63 | 57.79 |
| Tension Set, % | 33 | 33 | break | 30 | 30 |
| Compression Set, % 22 hrs @ 100 C. | 45 | 54 | 55 | 52 | 50 |
| Weight change, % Fluid #3, 24 hrs @ 125 C. | 50.7 | 49.2 | 52.5 | 51.1 | 129.3 |
| Notched Izod Impact at −40 C. me6055 | 199 +/− 17 CB | 198 +/− 11 CB | 61 +/− 4 CB | 309 +/− 58 NACB | 509 +/− 8 NACB |

HCPP = high crystalinity PP

TABLE 12

Evaluation of Various Metallocene and Ziegler Polypropylenes
in DVAs (same base formulations as Table 11 for ex. 97–102)

|  | Example # | | | | | | | | |
|---|---|---|---|---|---|---|---|---|---|
|  | 109 | 110 | 111 | 112 | 113 | 114 | 115 | 116 | 117 |
| Diluent Type | SUNPAR | SUNPAR | SUNPAR | SUNPAR | SUNPAR | SUNPAR | SUNPAR | SUNPAR | Plasthall 100 |
| Polypropylene, Ziegler (Z) or Metallocene (M) | 51S07A(Z) | 51S07A(Z) | 18897-066-001 | 18897-066-001 | 18897-066-003 | 18897-066-003 | 18897-066-005 | 18897-066-005 | 51S07A(Z) |
| ACR Viscosity at 200 C., Poise | 2149 |  | 1795 |  |  |  | 1662 |  | 1598 |
| HARDNESS, Shore A | 73 | 74 | 73 | 73 | 72 | 73 | 74 | 73 | 72 |
| Stress at 50% strain, MPa | 3.03 | 3.55 | 2.93 | 3.06 | 2.87 | 2.82 | 2.99 | 3.02 | 2.84 |
| Stress at 100% strain, MPa | 4.54 | 5.27 | 4.45 | 4.58 | 4.34 | 4.26 | 4.60 | 4.67 | 4.33 |
| Stress at 200% strain, MPa | 7.46 | 8.57 | 7.22 | 7.33 | 7.10 | 6.96 | 7.71 | 7.93 | 7.09 |
| Tensile Strength, MPa | 10.28 | 12.24 | 10.42 | 11.12 | 10.18 | 10.38 | 11.52 | 11.52 | 10.56 |
| Elongation at break, % | 289 | 302 | 300 | 314 | 300 | 355 | 298 | 288 | 308 |
| Toughness, MPa | 16.84 | 21.10 | 17.47 | 19.35 | 17.10 | 17.41 | 18.40 | 17.68 | 17.92 |
| Tension Set, % | 10 | 10 | 10 | 10 | 13 | 13 | 10 | 10 | 13 |
| Weight Gain % | 77 | 78 | 75 | 73 | 85 | 83 | 81 | 82 | 95 |
| Compression Set % | 28 | 26 | 27 | 29 | 29 | 28 | 26 | 25 | 28 |
|  | 27 | 25 | 28 | 28 | 30 | 29 | 27 | 25 | 29 |
| 219 PP |  |  |  |  |  |  |  |  |  |
| Notched Izod at −40 C., J/m | 206 +/− 13 |  | 65 +/− 8 |  | 104 +/− 8 |  | 111 +/− 6 |  | 754 +/− 35 |
| HARDNESS, Shore D | 45 | 44 | 45 | 45 | 45 | 43 | 44 | 43 | 42 |
| Stress at 50% strain, MPa | 9.15 | 10.56 | 10.06 | 10.18 | 9.71 | 9.36 | 9.52 | 9.31 | 9.38 |
| Stress at 100% strain, MPa | 10.27 | 12.09 | 11.35 | 11.45 | 11.16 | 10.59 | 10.78 | 10.60 | 10.79 |
| Stress at 200% strain, MPa | 11.97 | 14.78 | 13.44 | 13.65 | 13.66 | 12.75 | 13.00 | 12.83 | 13.09 |
| Tensile Strength, MPa | 18.23 | 24.70 | 20.99 | 22.92 | 24.74 | 23.59 | 24.25 | 25.13 | 21.00 |
| Elongation at break, % | 439 | 402.4 | 396 | 405 | 411.6 | 433 | 423.6 | 445 | 411.5 |
| Toughness, MPa | 55.20 | 62.13 | 54.86 | 58.55 | 60.55 | 61.35 | 60.5 | 64.83 | 56.02 |
| Tension Set, % | 29 | 28.5 | 30.5 | 31 | 32.5 | 31 | 32.5 | 31 | 33.5 |
| Weight Gain % | 48 | 48 | 44 | 46 | 72 | 75 | 73 | 78 | 54 |
| Compression Set % | 54 | 53 | 52 | 51 | 51 | 48 | 51 | 49 | 54 |

|  | Example # | | | | | | |
|---|---|---|---|---|---|---|---|
|  | 118 | 119 | 120 | 121 | 122 | 123 | 124 |
| Diluent Type | Plasthall 100 | Plasthall 100 | Plasthall 100 | Plasthall 100 | Plasthall 100 | Plasthall 100 | Plasthall 100 |
| Polypropylene, Ziegler (Z) or Metallocene (M) | 51S07A(Z) | 18897-066-001 | 18897-066-001 | 18897-066-003 | 18897-066-003 | 18897-066-005 | 18897-066-00 |
| ACR Viscosity at 200 C., Poise |  | 996 |  | 1047 |  | 1037 |  |
| HARDNESS, Shore A | 72 | 73 | 72 | 71 | 71 | 70 | 70 |
| Stress at 50% strain, MPa | 2.66 | 2.59 | 2.56 | 2.42 | 2.45 | 2.43 | 2.42 |
| Stress at 100% strain, MPa | 3.99 | 3.84 | 3.81 | 3.65 | 3.71 | 3.62 | 3.51 |

TABLE 12-continued

Evaluation of Various Metallocene and Ziegler Polypropylenes
in DVAs (same base formulations as Table 11 for ex. 97–102)

| | | | | | | | |
|---|---|---|---|---|---|---|---|
| Stress at 200% strain, MPa | 6.44 | 6.09 | 6.05 | 5.92 | 6.07 | 5.88 | 5.58 |
| Tensile Strength, MPa | 9.77 | 8.33 | 7.70 | 7.99 | 8.63 | 8.39 | 7.72 |
| Elongation at break, % | 321 | 291 | 270 | 282 | 294 | 304 | 293 |
| Toughness, MPa | 17.51 | 14.04 | 12.19 | 12.78 | 14.13 | 14.49 | 13.00 |
| Tension Set, % | 10 | 10 | 10 | 10 | 10 | 13 | 12 |
| Weight Gain % | 94 | 84 | 89 | 96 | 97 | 103 | 107 |
| Compression Set % | 30 | 28 | 28 | 26 | 26 | 28 | 31 |
| | 29 | 29 | 27 | 27 | 26 | 29 | 32 |
| 219 PP | | | | | | | |
| Notched Izod at −40 C., J/m | | 445 +/− 19 | | 671 +/− 26 | | 699 +/− 16 | |
| HARDNESS, Shore D | 42 | 41 | 42 | 41 | 41 | 41 | 41 |
| Stress at 50% strain, MPa | 9.15 | 9.08 | 9.11 | 8.61 | 8.46 | 8.55 | 8.44 |
| Stress at 100% strain, MPa | 10.27 | 10.25 | 10.23 | 9.66 | 9.41 | 9.66 | 9.42 |
| Stress at 200% strain, MPa | 11.97 | 12.08 | 11.77 | 11.33 | 10.81 | 11.41 | 10.92 |
| Tensile Strength, MPa | 18.23 | 19.21 | 17.18 | 20.02 | 19.08 | 20.51 | 17.77 |
| Elongation at break, % | 439 | 419.4 | 420 | 459.6 | 505 | 466.4 | 472 |
| Toughness, MPa | 55.2 | 53.22 | 51.04 | 57.78 | 61.91 | 59.48 | 56.6 |
| Tension Set, % | 32 | 32.5 | 32 | 34.5 | 33 | 32.5 | 32 |
| Weight Gain % | 57 | 49 | 51 | 85 | 83 | 87 | 87 |
| Compression Set % | 54 | 55 | 57 | 57 | 60 | 56 | 59 |

TABLE 13

EVALUATION OF METALLOCENE EPDM IN HARD DVAs OF VARYING CURE STATE

| | Example # | | | | | | | | |
|---|---|---|---|---|---|---|---|---|---|
| | 125 | 126 | 127 | 128 | 129 | 130 | 131 | 132 | 133 |
| Ingredient | phr | phr | phr | phr | phr | phr | phr | phr | phr |
| V7500 | 100 | 90 | 80 | 60 | 90 | 80 | 60 | 0 | 0 |
| 223B, C2 = 12.15%, ML125 = 12.3, ENB = 4.00 | 0 | 0 | 0 | 0 | 0 | 0 | 0 | 100 | 0 |
| 236A, C2 = 13.98%, ML125 = 12.9, ENB = 5.14 | 0 | 10 | 20 | 40 | 0 | 0 | 0 | 0 | 100 |
| 225A, C2 = 15.7%, ML125 = 7.2, ENB = 5.3 | 0 | 0 | 0 | 0 | 10 | 20 | 40 | 0 | 0 |
| Rexene 51S07A | 220 | 220 | 220 | 220 | 220 | 220 | 220 | 220 | 220 |
| Sunpar 150 | 80.25 | 80.25 | 80.25 | 80.25 | 80.25 | 80.25 | 80.25 | 80.25 | 80.25 |
| Masterbatch Formula Wt | 400.25 | 400.25 | 400.25 | 400.25 | 400.25 | 400.25 | 400.25 | 400.25 | 400.25 |
| Sunpar 150 | 26.75 | 26.75 | 26.75 | 26.75 | 26.75 | 26.75 | 26.75 | 26.75 | 26.75 |
| Zinc Oxide | 2.00 | 2.00 | 2.00 | 2.00 | 2.00 | 2.00 | 2.00 | 2.00 | 2.00 |
| SP1045 | | | | | | | | | |
| DVA #1 | 7.00 | 7.00 | 7.00 | 7.00 | 7.00 | 7.00 | 7.00 | 7.00 | 7.00 |
| DVA #2 | 1.50 | 1.50 | 1.50 | 1.50 | 1.50 | 1.50 | 1.50 | 1.50 | 1.50 |
| DVA #3 | 4.00 | 4.00 | 4.00 | 4.00 | 4.00 | 4.00 | 4.00 | 4.00 | 4.00 |
| Sncl2 dihydrate | | | | | | | | | |
| DVA #1 | 1.50 | 1.50 | 1.50 | 1.50 | 1.50 | 1.50 | 1.50 | 1.50 | 1.50 |
| DVA #2 | 1.00 | 1.00 | 1.00 | 1.00 | 1.00 | 1.00 | 1.00 | 1.00 | 1.00 |
| DVA #3 | 1.25 | 1.25 | 1.25 | 1.25 | 1.25 | 1.25 | 1.25 | 1.25 | 1.25 |
| Hardness, Shore D | | | | | | | | | |
| DVA #1 | 47 | 47 | 48 | 48 | 47 | 47 | 46 | 48 | 48 |
| DVA #2 | 41 | 43 | 42 | 42 | 42 | 42 | 42 | 44 | 41 |
| DVA #3 | 43 | 44 | 44 | 45 | 44 | 43 | 43 | 45 | 44 |
| Stress at 100% strain, MPa | | | | | | | | | |
| DVA #1 | 10.66 | 10.62 | 10.85 | 10.73 | 10.75 | 10.50 | 10.57 | 10.51 | 10.25 |
| DVA #2 | 9.18 | 9.34 | 9.58 | 9.81 | 9.52 | 9.49 | 9.84 | 9.89 | 10.12 |
| DVA #3 | 10.02 | 10.17 | 10.10 | 10.17 | 10.10 | 10.01 | 10.04 | 10.34 | 9.71 |
| Tensile Strength, MPa | | | | | | | | | |
| DVA #1 | 21.83 | 21.25 | 20.07 | 19.76 | 21.39 | 20.49 | 18.95 | 17.09 | 18.72 |
| DVA #2 | 13.13 | 13.93 | 13.43 | 14.77 | 14.42 | 14.76 | 14.97 | 15.67 | 16.78 |
| DVA #3 | 18.43 | 19.10 | 18.23 | 18.16 | 18.59 | 18.37 | 17.50 | 18.35 | 17.41 |
| Elongation at break, % | | | | | | | | | |
| DVA #1 | 476 | 472 | 446 | 462 | 469 | 484 | 452 | 468 | 494 |
| DVA #2 | 454 | 511 | 455 | 551 | 526 | 560 | 592 | 614 | 629 |
| DVA #3 | 499 | 537 | 529 | 534 | 534 | 550 | 539 | 633 | 639 |

TABLE 13-continued

EVALUATION OF METALLOCENE EPDM IN HARD DVAs OF VARYING CURE STATE

| | Example # | | | | | | | | |
|---|---|---|---|---|---|---|---|---|---|
| | 125 | 126 | 127 | 128 | 129 | 130 | 131 | 132 | 133 |
| Toughness, MPa | | | | | | | | | |
| DVA #1 | 65.51 | 64.18 | 60.28 | 61.40 | 64.41 | 64.41 | 58.51 | 58.74 | 63.00 |
| DVA #2 | 47.23 | 55.24 | 49.33 | 63.15 | 58.43 | 62.39 | 67.79 | 73.29 | 76.71 |
| DVA #3 | 62.51 | 69.23 | 67.41 | 67.70 | 68.41 | 68.93 | 66.72 | 83.31 | 80.07 |
| Tension Set, % | | | | | | | | | |
| DVA #1 | 33 | 33 | 34 | 35 | 33 | 34 | 36 | 42 | 38 |
| DVA #2 | 39 | 39 | 39 | 43 | 41 | 41 | 45 | 47 | 45 |
| DVA #3 | 32 | 33 | 33 | 34 | 33 | 33 | 35 | 41 | 38 |
| % Weight Gain: 24 hrs. @ 125° C. | | | | | | | | | |
| DVA #1 | 56 | 56 | 55 | 56 | 55 | 56 | 58 | 63 | 59 |
| DVA #2 | 83 | 81 | 82 | 78 | 83 | 82 | 86 | 78 | 79 |
| DVA #3 | 61 | 60 | 60 | 60 | 63 | 62 | 62 | 68 | 66 |
| Compression Set, %: 22 hrs. @ 100° C. | | | | | | | | | |
| DVA #1 | 57 | 55 | 54 | 58 | 55 | 58 | 60 | 61 | 57 |
| DVA #2 | 70 | 69 | 71 | 70 | 70 | 74 | 74 | 73 | 75 |
| DVA #3 | 57 | 54 | 57 | 60 | 59 | 61 | 60 | 62 | 64 |

TABLE 14

Examples of metallocene EPDM in soft DVA's of varying cure state

| | Example # | | | | | | | | | |
|---|---|---|---|---|---|---|---|---|---|---|
| | 134 | 135 | 136 | 137 | 138 | 139 | 140 | 141 | 142 | 143 |
| Ingredient | phr | phr | phr | phr | phr | phr | phr | | | |
| V7500 | 100 | 90 | 80 | 60 | 90 | 80 | 60 | 0 | 0 | 0 |
| 223B, C2 = 12.15%, | 0 | 0 | 0 | 0 | 0 | 0 | 0 | 100 | 0 | 0 |
| 236A, C2 = 13.98%, | 0 | 10 | 20 | 40 | 0 | 0 | 0 | 0 | 100 | 0 |
| 225A, C2 = 15.7%, ML125 = 7.2, ENB = 5.3 | 0 | 0 | 0 | 0 | 10 | 20 | 40 | 0 | 0 | 100 |
| Rexene 51S07A | 59.1 | 59.1 | 59.1 | 59.1 | 59.1 | 59.1 | 59.1 | 59.1 | 59.1 | 59.1 |
| Sunpar 150 | 80.3 | 80.3 | 80.3 | 80.3 | 80.3 | 80.3 | 80.3 | 80.3 | 80.3 | 80.3 |
| Masterbatch Formula Wt. - | 2395 | 2395 | 2395 | 2395 | 2395 | 2395 | 2395 | 2395 | 2395 | 2395 |
| Sunpar 150 | 26.8 | 26.8 | 26.8 | 26.8 | 26.8 | 26.8 | 26.8 | 26.8 | 26.8 | 26.8 |
| Zinc Oxide | 2.00 | 2.00 | 2.00 | 2.00 | 2.00 | 2.00 | 2.00 | 2.00 | 2.00 | 2.00 |
| SP1045 | | | | | | | | | | |
| DVA #1 | 7.00 | 7.00 | 7.00 | 7.00 | 7.00 | 7.00 | 7.00 | 7.00 | 7.00 | 7.00 |
| DVA #2 | 1.50 | 1.50 | 1.50 | 1.50 | 1.50 | 1.50 | 1.50 | 1.50 | 1.50 | 1.50 |
| DVA #3 | 4.00 | 4.00 | 4.00 | 4.00 | 4.00 | 4.00 | 4.00 | 4.00 | 4.00 | 4.00 |
| Sncl2 dihydrate | | | | | | | | | | |
| DVA #1 | 1.50 | 1.50 | 1.50 | 1.50 | 1.50 | 1.50 | 1.50 | 1.50 | 1.50 | 1.50 |
| DVA #2 | 1.00 | 1.00 | 1.00 | 1.00 | 1.00 | 1.00 | 1.00 | 1.00 | 1.00 | 1.00 |
| DVA #3 | 1.25 | 1.25 | 1.25 | 1.25 | 1.25 | 1.25 | 1.25 | 1.25 | 1.25 | 1.25 |
| Hardness, Shore A | | | | | | | | | | |
| DVA #1 | 67 | 69 | 69 | 72 | 71 | 72 | 73 | 67 | 67 | 64 |
| DVA #2 | 65 | 66 | 68 | 69 | 68 | 68 | 69 | 63 | 68 | 64 |
| DVA #3 | 69 | 69 | 69 | 68 | 68 | 67 | 68 | 67 | 68 | 65 |
| Stress at 100% strain, MPa | | | | | | | | | | |
| DVA #1 | 3.71 | 3.75 | 4.01 | 3.99 | 3.92 | 3.86 | 3.91 | 3.72 | 3.65 | 3.25 |
| DVA #2 | 2.66 | 2.78 | 2.80 | 3.06 | 2.94 | 2.77 | 2.94 | 2.74 | 3.51 | 2.63 |
| DVA #3 | 3.70 | 3.83 | 4.07 | 3.87 | 3.40 | 3.57 | 3.47 | 3.34 | 3.10 | 2.78 |
| Tensile Strength, MPa | | | | | | | | | | |
| DVA #1 | 9.30 | 7.52 | 8.61 | 9.04 | 9.08 | 9.45 | 8.40 | 9.44 | 9.08 | 8.11 |
| DVA #2 | 5.50 | 6.14 | 6.38 | 6.95 | 6.29 | 6.07 | 5.69 | 6.45 | 7.93 | 4.87 |
| DVA #3 | 8.20 | 8.03 | 7.82 | 8.45 | 8.38 | 8.44 | 7.39 | 9.95 | 7.91 | 8.18 |
| Elongation at break, % | | | | | | | | | | |
| DVA #1 | 301 | 250 | 269 | 306 | 305 | 324 | 287 | 345 | 312 | 344 |
| DVA #2 | 334 | 389 | 421 | 451 | 416 | 450 | 461 | 465 | 477 | 407 |
| DVA #3 | 286 | 277 | 260 | 310 | 345 | 346 | 339 | 465 | 365 | 488 |

TABLE 14-continued

Examples of metallocene EPDM in soft DVA's of varying cure state

|  | Example # | | | | | | | | | |
|---|---|---|---|---|---|---|---|---|---|---|
|  | 134 | 135 | 136 | 137 | 138 | 139 | 140 | 141 | 142 | 143 |
| Toughness, MPa | | | | | | | | | | |
| DVA #1 | 15.02 | 10.73 | 13.08 | 16.17 | 16.02 | 17.08 | 13.88 | 18.23 | 15.52 | 15.72 |
| DVA #2 | 11.62 | 15.00 | 17.14 | 19.95 | 17.27 | 17.69 | 18.49 | 18.70 | 24.26 | 13.60 |
| DVA #3 | 13.30 | 12.88 | 12.10 | 15.39 | 16.45 | 16.98 | 15.45 | 25.96 | 16.37 | 22.79 |
| Tension Set, % | | | | | | | | | | |
| DVA #1 | 8 | 8 | 8 | 8 | 8 | 8 | 10 | 15 | 10 | 13 |
| DVA #2 | 10 | 13 | 15 | 15 | 13 | 15 | 18 | 23 | 20 | 20 |
| DVA #3 | 8 | 8 | 8 | 8 | 8 | 8 | 10 | 18 | 13 | 15 |
| % Weight Gain: 24 hrs. @ 125° C. | | | | | | | | | | |
| DVA #1 | 89.7 | 90.3 | 93.0 | 92.8 | 92.2 | 96.8 | 103.3 | 130.6 | 108.9 | 128.9 |
| DVA #2 | 228.7 | 185.1 | 184.3 | 188.6 | 200.8 | 187.3 | 200.8 | 193.9 | 207.5 | 218.6 |
| DVA #3 | 103.0 | 104.5 | 101.3 | 106.5 | 117.3 | 113.5 | 116.9 | 166.7 | 139.8 | 168.1 |
| Compression Set, %: 22 hrs. @ 100° C. | | | | | | | | | | |
| DVA #1 | 21 | 23 | 25 | 28 | 25 | 26 | 28 | 32 | 3 | 33 |
| DVA #2 | 37 | 35 | 36 | 38 | 41 | 42 | 45 | 52 | 47 | 59 |
| DVA #3 | 22 | 23 | 20 | 24 | 28 | 31 | 28 | 37 | 33 | 37 |

TABLE 15

Examples of different cure systems using metallocene versus Ziegler polypropylene in EPDMs

|  | Example # | | | | | | | | | |
|---|---|---|---|---|---|---|---|---|---|---|
|  | 144 | 145 | 146 | 147 | 148 | 149 | 150 | 151 | 152 | 153 |
| Cure System | R | R | R | R | R | HS | HS | P | P | P |
| INGREDIENT | phr | phr | phr | phr | phr | phr | phr | phr | phr | phr |
| Ziegler V7500 | 100 | 100 | 0 | 0 | 0 | 0 | 0 | 0 | 0 | 0 |
| Metallocene, 258C, C2 = 55.5, ML @ 125 C. = 52.1, ENB = 5.86 | 0 | 0 | 100 | 100 | 0 | 0 | 0 | 0 | 0 | 0 |
| Metallocene, 254B, C2 = 73.03, ML @ 125 C. = 39.5, ENB = 4.92 | 0 | 0 | 0 | 0 | 100 | 0 | 0 | 0 | 0 | 0 |
| Ziegler MDV96-8, VNB EPDM | 0 | 0 | 0 | 0 | 0 | 200 | 200 | 200 | 200 | 200 |
| Ziegler Lyondel 51S07A, MFR 0.7 | 59 | 0 | 59 | 0 | 59 | 59 | 0 | 59 | 0 | 0 |
| Metallocene, 18897-066-001 | 0 | 59 | 0 | 59 | 0 | 0 | 59 | 0 | 59 | 59 |
| Sunpar 150M Oil | 107 | 107 | 107 | 107 | 107 | 0 | 0 | 0 | 0 | 0 |
| Zinc Oxide | 2 | 2 | 2 | 2 | 2 | 0 | 0 | 0 | 0 | 0 |
| SnCl2 | 1.5 | 1.5 | 1.5 | 1.5 | 1.5 | 0 | 0 | 0 | 0 | 0 |
| SP1045 | 6 | 6 | 6 | 6 | 6 | 0 | 0 | 0 | 0 | 0 |
| HT-100 White Oil | 0 | 0 | 0 | 0 | 0 | 7 | 7 | 7 | 7 | 7 |
| Silicone Hydride | 0 | 0 | 0 | 0 | 0 | 2.25 | 2.25 | 0 | 0 | 0 |
| PC085, Pt catalyst, 0.75 ppm Pt for VNB EPDM; 12 ppm Pt for ENB EP | 0 | 0 | 0 | 0 | 0 | 3 | 3 | 0 | 0 | 0 |
| Luperox 101XL45 (Luperco 101XL) 45% | 0 | 0 | 0 | 0 | 0 | 0 | 0 | 1.13 | 1.13 | 0 |
| Luperox HP101XLP (Luperco 101SL-SR) 44% | 0 | 0 | 0 | 0 | 0 | 0 | 0 | 0 | 0 | 1.15 |
| TAC 50% Active | 0 | 0 | 0 | 0 | 0 | 0 | 0 | 3.3 | 3.3 | 3.3 |
|  | 275.5 | 275.5 | 275.5 | 275.5 | 275.5 | 271.3 | 271.3 | 270.4 | 270.4 | 270.5 |
| HARDNESS, Shore A | 69 | 68 | 69 | 67 | 72 | 70 | 70 | 66 | 68 | 65 |
| Stress at 100% strain, MPa | 3.70 | 3.43 | 3.67 | 3.34 | 3.65 | 3.71 | 3.47 | 2.83 | 3.34 | 275 |
| Tensile Strength, MPa | 9.59 | 7.81 | 9.14 | 8.46 | 10.71 | 9.25 | 7.99 | 5.58 | 5.51 | 4.66 |
| Elongation at break, % | 318 | 287 | 303 | 313 | 414 | 444 | 490 | 355 | 281 | 304 |
| Toughness, MPa | 16.48 | 12.52 | 14.99 | 14.37 | 23.64 | 25.05 | 25.26 | 13.21 | 10.60 | 9.72 |
| Tension Set, % | 7.5 | 7 | 7 | 7 | 13 | 12 | 13 | 12 | 15 | 17 |
| % Weight Gain: 24 hrs. @ 125° C. | 93 | 90 | 94 | 89 | 111 | 126 | 140 | 171 | 164 | 199 |
| Compression Set %: 22 hrs. @ 100° C. | 25 | 27 | 23 | 27 | — | 34 | 38 | 36 | 33 | 45 |

|  | Example # | | | | |
|---|---|---|---|---|---|
|  | 154 | 155 | 156 | 157 | 158 |
| Cure System | HS | HS | P | P | P |
| INGREDIENT | phr | phr | phr | phr | phr |
| Ziegler V7500 | 100 | 100 | 100 | 100 | 100 |
| Metallocene, 258C, C2 = 55.5, ML @ 125 C. = 52.1, ENB = 5.86 | 0 | 0 | 0 | 0 | 0 |

TABLE 15-continued

Examples of different cure systems using metallocene versus Ziegler polypropylene in EPDMs

| | | | | | |
|---|---|---|---|---|---|
| Metallocene, 254B, C2 = 73.03, ML @ 125 C. = 39.5, ENB = 4.92 | 0 | 0 | 0 | 0 | 0 |
| Ziegler MDV96-8, VNB EPDM | 0 | 0 | 0 | 0 | 0 |
| Ziegler Lyondel 51S07A, MFR 0.7 | 59 | 0 | 59 | 0 | 59 |
| Metallocene, 18897-066-001 | 0 | 59 | 0 | 59 | 0 |
| Sunpar 150M Oil | 0 | 0 | 0 | 0 | 0 |
| Zinc Oxide | 0 | 0 | 0 | 0 | 0 |
| SnCl2 | 0 | 0 | 0 | 0 | 0 |
| SP1045 | 0 | 0 | 0 | 0 | 0 |
| HT-100 White Oil | 107 | 107 | 107 | 107 | 107 |
| Silicone Hydride | 2.25 | 2.25 | 0 | 0 | 0 |
| PC085, Pt catalyst, 0.75 ppm Pt for VNB EPDM; 12 ppm Pt for ENB EP | 3 | 3 | 0 | 0 | 0 |
| Luperox 101XL45 (Luperco 101XL) 45% | 0 | 0 | 1.13 | 1.13 | 0 |
| Luperox HP101XLP (Luperco 101SL-SR) 44% | 0 | 0 | 0 | 0 | 1.15 |
| TAC 50% Active | 0 | 0 | 3.3 | 3.3 | 3.3 |
| | 271.3 | 271.3 | 270.4 | 270.4 | 270.5 |
| HARDNESS, Shore A | 64 | 63 | 63 | 68 | 63 |
| Stress at 100% strain, MPa | 2.93 | 2.87 | 2.45 | 2.93 | 2.21 |
| Tensile Strength, MPa | 5.08 | 5.28 | 4.75 | 5.07 | 4.11 |
| Elongation at break, % | 339 | 360 | 355 | 302 | 324 |
| Toughness, MPa | 11.90 | 13.09 | 11.18 | 10.33 | 8.72 |
| Tension Set, % | 22 | 20 | 14 | 15 | 15 |
| % Weight Gain: 24 hrs. @ 125° C. | 201 | 176 | 184 | 177 | 215 |
| Compression Set %: 22 hrs. @ 100° C. | 45 | 38 | 39 | 39 | 45 |

While the best mode and preferred embodiment of the invention have been set forth in accord with the patent statutes, the scope of the invention is not limited thereto, but rather is defined by the attached claims.

With respect to the examples, the following raw materials and their source are provided.

IDENTIFICATION OF RAW MATERIALS

Vistalon7500, C2%=56%; ML(1+4)125° C.=82; ENB= 5.7%; Ziegler Catalyst (Exxon Chemical Co.)

Epsyn P597 rubber, extended with 100 parts paraffinic oil, Ziegler Catalyst, (Copolymer Rubber & Chemical Co.—DSM)

VX4779 EP(D)M, C2=64%, extended with 75 parts oil, Ziegler Catalyst (Exxon Chemical Co.)

Polypropylene, Ziegler PP, Rexene/Lyondel 51S07A, 0.7 MFR, (Lyondel Corp.)

Polypropylene, Ziegler PP, Aristech FP200F, 20 MFR, (Aristech Corp.)

Polypropylene, Ziegler-Natta PP, DX5A15H, (Shell)

PP 18897-006-001, 6 MFR, Metallocene PP made by Unsupported Metallocene Catalyst (Exxon Chemical Co.)

PP 18897-066-005, Metallocene PP, 6.7 MFR made by Supported Metallocene Catalyst (Exxon Chemical Co.)

PP 18897-066-006, 32 MFR, Metallocene PP, made by Supported Metallocene Catalyst (Exxon Chemical Co.)

Sunpar® 150, (Sun Chemical)

HT-100 White Parafinnic Oil, Petro Canada

SP-1045, (Schenectady International Inc.)

Plasthall® 100, (C.P. Hall)

Vulkup 40 KE, (Hercules)

Triallyl Isocyanurate/Perkalink, (Cytec/Akzo)

Lurerox IUIXL (Alf Altochem)

Stannous Chloride, (Masson Metals)

Silicone Hydride (Dow Corning)

Santoprene 103-40 (Advanced Elastomer Systems, L.P.)

RG7034 (Advanced Elastomer Systems, L.P. Composition)

Physical Characterization of Metallocene Polymers

| POLYMER EPM/EPDM | Mn x $10^{-3}$ | Mw x $10^{-3}$ | MWD | C2 | MOONEY ML125° C. | ENB % | CATALYST* |
|---|---|---|---|---|---|---|---|
| 19397-36A | 80 | 149 | 1.83 | 12 | 2 or 3 | 0 | Isotactic |
| 19397-36B | 78 | 142 | 1.82 | 18 | 2 or 3 | 0 | Isotactic |
| 19397-52A | 91 | 170 | 1.88 | 15 | 24.8 | 0 | Isotactic |
| 19397-63B | 163 | 426 | 2.62 | 14 | 95 | 0 | Atactic |
| 223B | 98.9 | 177.4 | — | 12.15 | 12.3 | 3.0 | Isotactic |
| 236A | 107.1 | 187 | — | 13.98 | 12.9 | 4.0 | Isotactic |
| 225A | 91.9 | 166.3 | — | 15.67 | 7.2 | 5.1 | Isotactic |
| 105B | 92 | 171 | 1.87 | 18 | 10 | 3.1 | Isotactic |
| 105B1 | 82 | 161 | 1.95 | 17.4 | 20 | 2.85 | Isotactic |
| 96A | — | — | — | 17 | 100 | 2.5 | Atactic |
| 209B | 98 | 197 | 2.01 | 30.4 | 30 | 3.2 | Isotactic |
| 209C | 110 | 217 | 1.98 | 31.5 | 37 | 6.7 | Isotactic |
| 208B | 93 | 192 | 2.07 | 31.9 | 43.4 | 4.2 | Isotactic |
| 208C | 103 | 206 | 1.99 | 32.9 | 58.2 | 5.8 | Isotactic |
| 88B | 201 | 452 | 2.24 | 40 | 102 | 3.0 | Isotactic |
| 258C | — | — | — | 55.5 | 52.1 | 5.86 | Isotactic |
| 254B | — | — | — | 73.03 | 39.5 | 4.92 | Isotactic |

Physical Characteristics of Polypropylene

| Polypropylene | MFR g/10 min | % Xylene Solubles | Stereo defects (/10,000 mers) | Regio defects (/10,000 mers) | Mn | Mw | Mw/Mn |
|---|---|---|---|---|---|---|---|
| 18897-066-001 | 6 | 0.21 | 17.5 | 40.5 | 128,302 | 237,362 | 1.85 |
| 18897-066-003 | 6.7 | 2.17 | 22 | 94.8 | 111,201 | 216,170 | 1.94 |

-continued

| | | | | | | |
|---|---|---|---|---|---|---|
| 18897-066-005 | 6.7 | 2.17 | 22 | 94.8 | 111,201 | 216,170 | 1.94 |
| 18897-066-006 | 32 | 0.24 | 23.3 | 41.7 | 83,732 | 149,876 | 1.79 |
| 51S07A | 0.7 | 3.15 | 84 | 119 | 119,103 | 588,145 | 4.93 |

Thus, it is apparent that there has been provided, in accordance with the invention, a thermoplastic elastomeric composition that fully satisfies the objects and advantages set forth above. While the invention has been described in conjunction while the invention has been described in conjunction with specific embodiments thereof, it is evident that many alternatives will be apparent to those skilled in the art in light of the foreign description. Accordingly, it is intended to embrace all such alternatives, modification and variations as fall within the spirit and broad scope of the appended claims.

What is claimed is:

1. A dynamically vulcanized thermoplastic elastomeric composition comprised of from 10 to 90% by weight of a first elastomeric polymer comprised of a cross-linked copolymer of ethylene, propylene and optionally a non-conjugated diene, said copolymer containing 10–40% by weight ethylene, and 90 to 10% by weight of a second thermoplastic polymer comprising a metallocene polymerized polypropylene.

2. The composition of claim 1 wherein said first polymer is comprised of a blend of a metallocene EP(D)M and a Ziegler-Natta EP(D)M.

3. The composition of claim 1 wherein said first polymer contains less than 20% by weight ethylene.

4. The composition of claim 1 wherein said first polymer is a terpolymer of ethylene, propylene and a non-conjugated diene.

5. The composition of claim 4 wherein said non-conjugated diene is selected from the group consisting of 5-ethylidene-2-norbornene, 1-4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene and mixtures thereof.

6. The composition of claim 1 wherein said second polymer is present in said composition at a level of about 10 to 40 percent by weight.

7. The composition of claim 1 wherein said second polymer comprises a blend of a metallocene polymerized polypropylene and a Ziegler-Natta polymerized polypropylene.

8. The composition of claim 1 wherein said first elastomeric polymer is the product of a metallocene polymerization process.

9. The composition of claim 1 wherein said metallocene polymerized polypropylene is prepared using a metaflocene catalyst of the general formula:

$$Cp_mMR_nX_q$$

wherein Cp is a cyclopentadienyl ring or a derivative thereof; M is a Group IV, V, or VI transition metal; R is a hydrocarbyl group or hydrocarboxyl group having from 1 to 20 carbon atoms; X is a halogen and m equals 1 to 3; n equals 0 to 3; q equals 0 to 3, and the sum of m+n+q is equal to the oxidation strength of the transition metal.

10. The composition of claim 8 wherein said first elastomeric copolymer is prepared using a metallocene catalyst of the general formula:

$$Cp_mMR_nX_q$$

wherein Cp is a cyclopentadienyl ring or a derivative thereof; M is a Group IV, V or VI transition metal; R is a hydrocarbyl group or hydrocarboxyl group having from 1 to 20 carbon atoms; X is a halogen and m equals 1 to 3; n equals 0 to 3; q equals 0 to 3, and the sum of m+n+q is equal to the oxidation strength of the transition metal.

* * * * *